(12) United States Patent
Fagan

(10) Patent No.: US 10,195,682 B2
(45) Date of Patent: Feb. 5, 2019

(54) METHOD AND SYSTEM FOR ENHANCED NUMERICAL CONTROL PLASMA CUTTING OF PARTS FROM A WORKPIECE

(71) Applicant: Matthew Fagan, Middle Park (AU)

(72) Inventor: Matthew Fagan, Middle Park (AU)

( * ) Notice: Subject to any disclaimer, the term of this patent is extended or adjusted under 35 U.S.C. 154(b) by 274 days.

(21) Appl. No.: 15/088,800

(22) Filed: Apr. 1, 2016

(65) Prior Publication Data

US 2016/0271718 A1   Sep. 22, 2016

Related U.S. Application Data

(60) Provisional application No. 62/136,237, filed on Mar. 20, 2015.

(30) Foreign Application Priority Data

Mar. 17, 2016 (EP) ..................................... 16160983

(51) Int. Cl.
| | |
|---|---|
| *B23K 10/00* | (2006.01) |
| *B23K 31/10* | (2006.01) |
| *B23K 37/02* | (2006.01) |
| *G05B 19/4155* | (2006.01) |

(52) U.S. Cl.
CPC ............ *B23K 10/006* (2013.01); *B23K 10/00* (2013.01); *B23K 31/10* (2013.01); *B23K 37/0258* (2013.01); *G05B 19/4155* (2013.01); *G05B 2219/45044* (2013.01)

(58) Field of Classification Search
None
See application file for complete search history.

(56) References Cited

U.S. PATENT DOCUMENTS

| | | | |
|---|---|---|---|
| 4,466,069 A | 8/1984 | Balfanz | |
| 6,772,040 B1 | 8/2004 | Picard et al. | |
| 8,428,767 B2 * | 4/2013 | Tremoureux | ............ B26D 5/00 |
| | | | 700/134 |
| 8,683,841 B1 | 4/2014 | Walsh | |
| 2008/0185368 A1 | 8/2008 | Fagan | |
| 2009/0071944 A1 | 3/2009 | Forlong | |
| 2009/0108792 A1* | 4/2009 | Fagan | .................... B23K 7/105 |
| | | | 318/568.1 |
| 2009/0250445 A1 | 10/2009 | Yamaguchi et al. | |

(Continued)

FOREIGN PATENT DOCUMENTS

WO       2012127319 A1    9/2012

OTHER PUBLICATIONS

EP Application No. 16160983.9, Extended European Search Report, dated Sep. 9, 2016, 8 pages.

(Continued)

*Primary Examiner* — Benjamin Sandvik
(74) *Attorney, Agent, or Firm* — Lathrop Gage LLP

(57) ABSTRACT

A system and method for cutting a workpiece utilizing a plasma cutting tool of fixed cut width into at least two parts having prescribed shapes from a metal plate comprising the steps of: identifying each of the parts by one or more contour lines; cutting a workpiece along one of the identifying contour lines into one of the parts using a tool of fixed cutting width; utilizing this cut contour of fixed width as part of the contour on an adjacent part fully overlapping the cut width. The process is repeated until all the required parts are cut.

26 Claims, 13 Drawing Sheets

(56) References Cited

U.S. PATENT DOCUMENTS

| | | |
|---|---|---|
| 2009/0312862 A1 | 12/2009 | Fagan |
| 2010/0155377 A1 | 6/2010 | Lindsay et al. |
| 2010/0301020 A1 | 12/2010 | Phillip et al. |
| 2010/0314361 A1 | 12/2010 | Buccella |
| 2011/0316977 A1 | 12/2011 | Pienaar |
| 2012/0192690 A1* | 8/2012 | Norberg Ohlsson .. B23K 26/38 83/13 |
| 2012/0242015 A1 | 9/2012 | Fagan |
| 2013/0200053 A1* | 8/2013 | Bordatchev ............ B23K 26/04 219/121.78 |
| 2014/0060271 A1 | 3/2014 | Norberg Ohlsson |
| 2014/0288691 A1 | 9/2014 | Fagan |

OTHER PUBLICATIONS

U.S. Appl. No. 14/182,056 Non Final Office Action dated Jun. 23, 2016, 15 pages.
International Application No. IB2014/000753 International Search Report & Written Opinion, dated Sep. 26, 2014, 17 pages.

\* cited by examiner

METHOD AND SYSTEM FOR ENHANCED NUMERICAL CONTROL PLASMA CUTTING OF PARTS FROM A WORKPIECE

RELATED APPLICATIONS

This Application claims priority to U.S. Patent Application Ser. No. 62/136,237, titled "Method and System for NC Plasma Common Cutting of Non-Rectangular Nested Parts", filed Mar. 20, 2015, and incorporated herein by reference in its entirety.

FIELD OF THE INVENTION

The application relates to the field of part cutting from sheets or plates and more specifically to methods for improving part cutting by employing varying degrees of overlap of cut lines and arcs between adjacent parts and efficiently eliminating or disposing of remnants thereof.

BACKGROUND

Conventional metal plate cutting technologies are well known in the art. Oxy acetylene plate cutting was the universal method used in the first half of the $20^{th}$ century. Electronic optically guided sheet and plate steel cutting machines appeared in the 1960s, machines which copied a drawn template by using a 'magic eye.'

Computer guided machines appeared in the 1970s, machines which followed coordinates given in a plain English language known as Numeric Control programs or NC programs. Plasma cutting itself appeared in the 1940s as an extension of electric arc welding, carrying the very high currents in a plasma gas which melted, rather than burned, the metal.

Plasma cutting was a much faster method but gave a poor cut quality, although adequate if the edge was going to be ground for welding. For materials up to 20 mm thick a plasma torch cuts up to 10 times faster than an oxy acetylene torch. An inert plasma gas could even be used for cutting highly combustible materials such as aluminum. Another advantage of plasma cutting is that the high speed combined with the ejection of hot molten material rather than combustion of the material reduced heat input into the plate and this in turn reduced potentially large thermally induced part movement during cutting.

In the 1970s, the high speed of plasma cutting had to be balanced with the relatively poor cut with high degrees of cut edge chamfer, as high as 45 degrees. Plasma torches could also generate unbearable noise levels and large amounts of ozone. In the 1990s High Definition Plasma cutting technology was a dramatic improvement with torches and gas and power supplies developed to cut with much less chamfer, higher edge quality and narrower cut width or kerf. Modern torches claim a cut edge chamfer as low as 2 degrees from vertical. As a consequence of straighter and narrower cuts, the penetration of plasma has increased from around 50 mm to 160 mm and beyond, challenging the dominance of oxy acetylene cutting of thick steel plate. Most recently the use of air alone as the plasma gas has reduced operating costs and the noise during operation has dropped to acceptable levels in a factory environment. The rapid drop in the price of computers after 2000 meant that computer controlled shape cutting has become affordable and standard in even the smallest workshops.

Such Numeric Control machines are used to cut flat plates or sheets into single parts or a collection of such parts on a plate, which is known as a nest. The parts within the nest are positioned by an NC programmer or by automatic nesting software to waste less metal.

SUMMARY

In one embodiment, a method enhances numerical control (NC) plasma cutting of parts from a workpiece. A nest that optimally positions the parts to minimize waste of the workpiece is generated within a computer. An NC program is generated, based upon the nest, to control an NC plasma cutting machine to cut the parts from the workpiece using one or both of edge starts and gap starts. The NC program controls a plasma cutting torch of the NC plasma cutting machine to cut the parts from the workpiece.

In another embodiment, a system enhances numerical control (NC) plasma cutting of parts from a workpiece. The system includes a processor and a memory communicatively coupled with the processor and storing machine readable instructions. For an edge start, the machine readable instructions, when executed by the processor, are capable of: (a) starting an arc of a plasma cutting torch while the cutting torch is positioned adjacent an edge of the workpiece and proximate a contour of one of the parts, and (b) immediately moving, when the plasma arc is established, the plasma cutting torch along the edge prior to follow the contour to cut the part from the workpiece. For a gap start, the machine readable instructions, when executed by the processor, are capable of: (c) positioning the plasma cutting torch at a previously cut path of the workpiece, and (d) starting an arc of the plasma cutting torch while moving the plasma cutting torch along the previously cut path prior to following a contour of one of the parts.

In another embodiment, a system has enhanced numerical control (NC) plasma cutting of parts from a workpiece. The system includes a processor and a memory communicatively coupled with the processor and storing machine readable instructions that when executed by the processor are capable of: interpreting an edge start M code of an NC program to (a) start a plasma arc of a cutting torch of an NC cutting machine when the cutting torch is positioned off of and adjacent to an edge of a workpiece, and (b) immediately start lateral movement of the cutting torch when the plasma arc is established; interpreting a gap start M code of the NC program to (c) start the plasma arc of the cutting torch when the cutting torch is positioned over a previously cut path on the workpiece, and (d) immediately start lateral movement of the cutting torch when the plasma arc is established; and interpreting a moving off M code of the NC program to extinguish the plasma arc of the cutting torch without stopping lateral movement of the cutting torch until the plasma arc is extinguished.

In another embodiment, a numerical control (NC) plasma cutting machine has an NC controller that includes a processor and a memory storing machine readable instructions that when executed by the processor interpret instructions of an NC program to control a plasma cutting torch of the NC plasma cutting machine to cut out parts from a workpiece. The NC controller interprets Geometric moves (G codes) that control movement of the plasma cutting torch and Miscellaneous functions (M codes) that control activation and deactivation of the plasma cutting torch. An improvement to the NC controller includes machine readable instructions stored within the memory that when executed by the processor are capable of interpreting an edge start M code to start a plasma arc of the cutting torch while the cutting torch is (a) positioned off and adjacent to an edge of the workpiece and (b) to immediately, once the plasma arc is established, start lateral movement of the cutting torch.

DETAILED DESCRIPTION OF THE EMBODIMENTS

Figure 1:
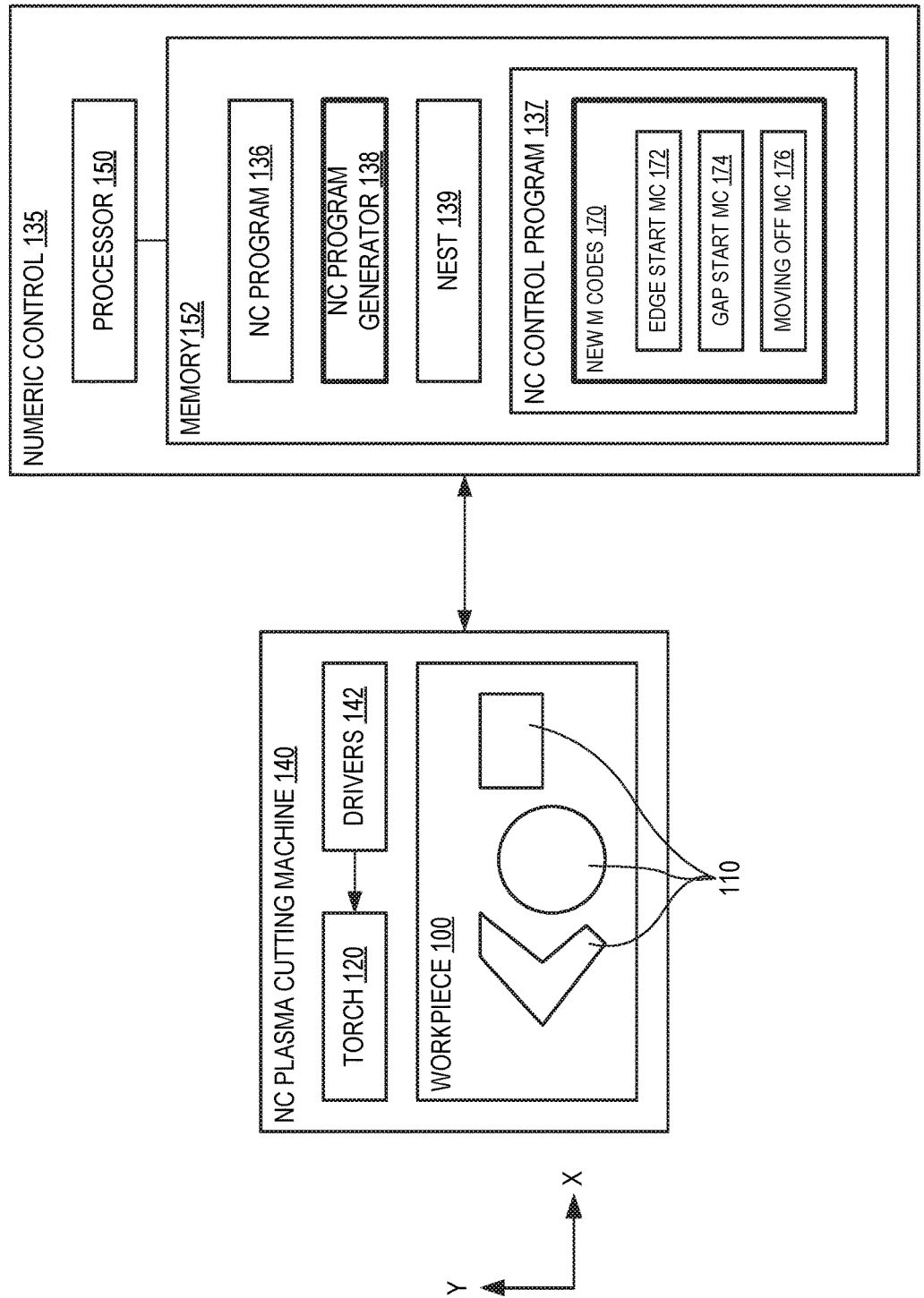
FIG. 1 shows an example idealized NC machine for plasma cutting flat plate, in an embodiment.

Systems and methods herein disclose how parts may be nested on a plate to result in cheaper, faster, cutting of the parts with less waste or scrap using a numerical control (NC) plasma cutting machine. The terms profile, path and contour may be used herein equivalently to mean the collection of lines and arcs that make up the geometry of part boundaries both external and internal, where internal boundaries may be described as holes. Usually paths are closed, whether internal or external. Unclosed internal paths are called 'slits'. Unclosed external paths are problematic as it is not clear where the part exists until a path closes. Cutting of shapes is variously known as 'profiling' or 'contouring'. Path, or cutting path, usually refers more specifically to the contour followed by a cutting machine, where it is called a 'tool path' in the general NC parlance. A part consists of a single outside profile and perhaps multiple holes in the part which are described as internal profiles cut from a block, sheet, or plate of material, referred to as a workpiece. The following discussion is concerned only with the external or outside profile that contains each part within the nest of parts. Unless a hole is big enough to accommodate smaller parts, it plays no part in the nesting logic.

The term "kerf" is a word for the width of the cut for a saw blade cutting wood. In all cutting, this is a critical dimension if the cut parts are to be the right size. The term was adopted by the NC industry to describe the amount by which a cut has to be offset to leave the part dimensions correct. This offset also, known as the kerf, is in practice half the cut width. To distinguish these two, the term kerf radius is used in the following description when referring to half the cut width. When cutting shapes, the shape cut from the workpiece is equal to the original shape size plus the width of the cut. This may be quite significant with plasma cutting, where the cut with is as much as 10 mm for thick material.

The cut width or kerf is thus critical to cutting and computations to generate NC programs that cut parts accurately. When cutting a shape, the torch center must be programmed to stay precisely a 'kerf radius' distance from the desired shape so that the part cut is the right size. This offsetting of the desired shape to the center of the torch is known as 'kerf compensation' and is one of the more demanding functions of an NC control to convert the programmed shape into the required shape, particularly when allowing for a variable cut width. Alternatively, the kerf compensation may be added directly to the NC program before it is sent to the NC cutting machine. In either event, for a dimensionally correct part, the final compensated cutter center path must be precisely one kerf radius outside the outside contour of the part and one kerf radius inside the internal contour (or holes) of the part.

Also of note is that thicker material requires a higher power for cutting which results in a larger kerf. For plasma cutting, the plasma kerf is between 4-10 mm for plasma currents in the range of 50 to 1000 amps, corresponding to a range of cutting thicknesses from around 3 mm to 160 mm. The problems being solved in the following embodiments concern the waste in workpiece material, which is a consequence of the very large kerf of NC plasma cutting machines.

In plasma cutting, a cut to each part is separately made by creating a starting hole or "pierce" adjacent to the part and then proceeding to cut or separate the part from the surrounding material. However, there is significant cost associated with creating the pierce as it requires large amounts of energy and time to pierce the material. Furthermore, piercing is extremely destructive and must be started a considerable distance from the part to avoid damaging the part, both in the resultant shape of the part and the metallurgy of the part that may be affected by heat during the pierce.

As a consequence of damage resulting from piercing, parts within a nest require adequate spacing to allow sufficient room for each pierce to avoid part damage. Allocation of this space disturbs the geometric nesting of the parts, resulting in substantial greater waste. This waste could be eliminated if external contour pierces were unnecessary or caused reduced damage.

Traditionally, any material is first pierced to create a hole for an edge cutting tool to work. Rarely is the edge cutting tool suitable for piercing the same material, and therefore a separate process is often used. For example, scissors may be used to cut cloth, but making a hole with the scissors is difficult. Typically, to cut multiple parts from one sheet or plate, multiple pierces are made. Each pierce is time consuming, wasteful of material, and is damaging. Minimization, and even elimination, of the need to pierce is a real objective because of the savings in time and plasma components. Total elimination of all pierces is impossible in many cases where parts have internal contours or holes but as described herein, the use of created 'opportunities' reduces the number of external pierces and their size such that damage may be reduced and in some cases totally eliminated.

The term "edge start" refers to a cut that starts directly from the edge of a plate. Logically, a pierce creates a hole and then allows edge cutting from that hole. By using an edge start on an existing edge of the workpiece, the need to penetrate the material is removed. Therefore, the edge start is considered a different starting technique. However, in the prior art of plasma cutting, there is no such separate edge start operation and all plasma starts presume piercing. For an edge start, before moving the torch to cut into the material, the edge of the material (metal) must be heated to burning or melting temperature, which requires time. Although this function is available for oxy acetylene cutting, this function is unknown in NC controls for plasma cutting.

System and methods of the following embodiments allow parts to be cut or separated from their surrounding material without the need or practice of creating individual starting holes or pierces for each part.

There have been a number of earlier technologies to reduce the number of external pierces. These include "chain cutting", "bridging", "common line cutting", "common cut pairs" and the creation of "opportunities" for reuse as described in the referenced patents.

Common Line cutting does not reduce the number of pierces required, but does reduce total cutting time, which was the original attraction in the days of slow oxy cutting where a plate could take twelve hours to cut. To complete a profile, often a pierce on the part contour is required, damaging the part. Thus, there are gains and losses. Common Line cutting is widely used only in countries like China, where the saving in costly material is more important than the saving in time and labor required to repair parts, by grinding after cutting for example. The material to wages cost ratio is for example ten times higher in Asia than in the US and Europe.

Traditional Common Line Cutting is therefore restricted to adjacent parallel lines, generally of the same length. A development of this idea is to cut only those sections of lines where overlap exists saving both cutting time and valuable material.

The use of Common Line Cutting has a number of additional savings. As there is no gap between parts, there is often no waste to pick up, such as in a nest of rectangles with common cut lines. There is also no skeleton around the common cut parts with a reduced cost in handling as there is often no awkward, dangerous, and heavy metal skeleton to lift away or break up.

However, as NC plate cutting machines proliferated after 1980, and massively after 2000, complex shape cutting became more common than simple rectangles and there were fewer opportunities for Common Line cutting, since traditional common line cutting is restricted to straight lines. The idea of common cut discs or annuli is unknown in the art and makes little sense on first examination. It was also held to be impossible as without entries and exits or bridges, consequential damage to parts would make such cutting unacceptable.

The embodiments described herein apply and extend shared Common Cutting to line/arc and arc/arc overlaps. This line/arc and arc/arc overlap is far from obvious, is contrary to common practice, and is unknown in the art. Overlapping plasma cuts was also held to be not only undesirable but near impossible in the prior art.

Experimental Discoveries

Overlapped cuts, or common line cuts, involving dissimilar arcs have not been used in plasma cutting for two reasons. Because dissimilar arcs cannot be mathematically common, there is no savings in cutting time, which was the traditional reason for applying common cutting. There was also no resulting savings in material. In the prior art of plasma cutting there were many widely accepted reasons why overlapped cutting or shared kerf areas did not work and therefore overlapped and/or common cuts were never considered. These reasons relate to the accepted wisdom of restrictions to plasma cutting that precluded overlaps, and to the significant changes needed to plasma torches, associated power supplies, and the NC controllers to enable cutting of such overlapped areas while minimizing part damage that was expected to result from such an overlap.

Observed Reasons Why Overlapped Plasma Cuts are not Possible

The following list provides the many reasons why overlapped plasma cuts were held to be impossible, unworkable and undesirable.

Figure 8:
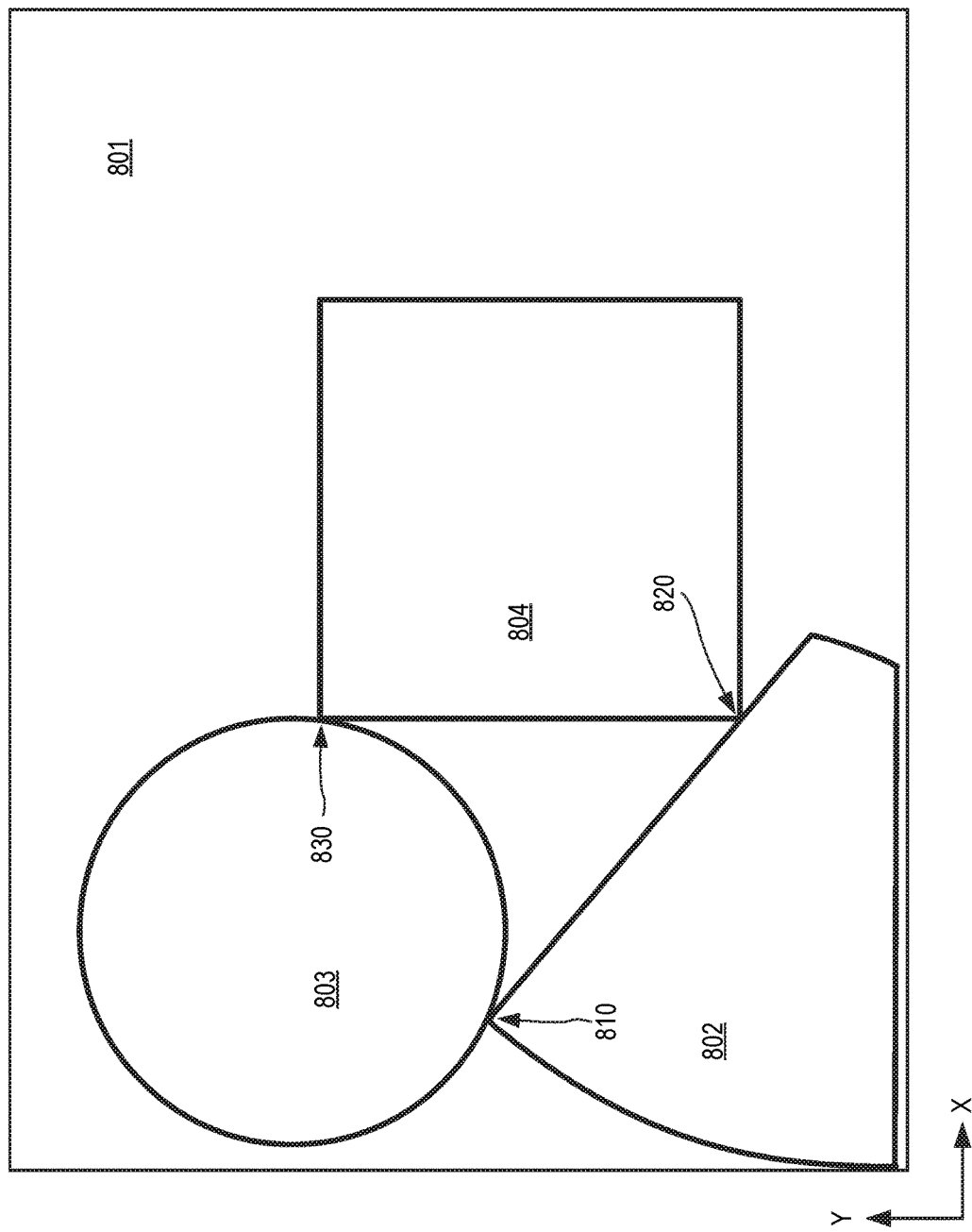
FIG. 8 shows an example common cutting nest with three different shapes and no pierces, in an embodiment.
Figure 11:
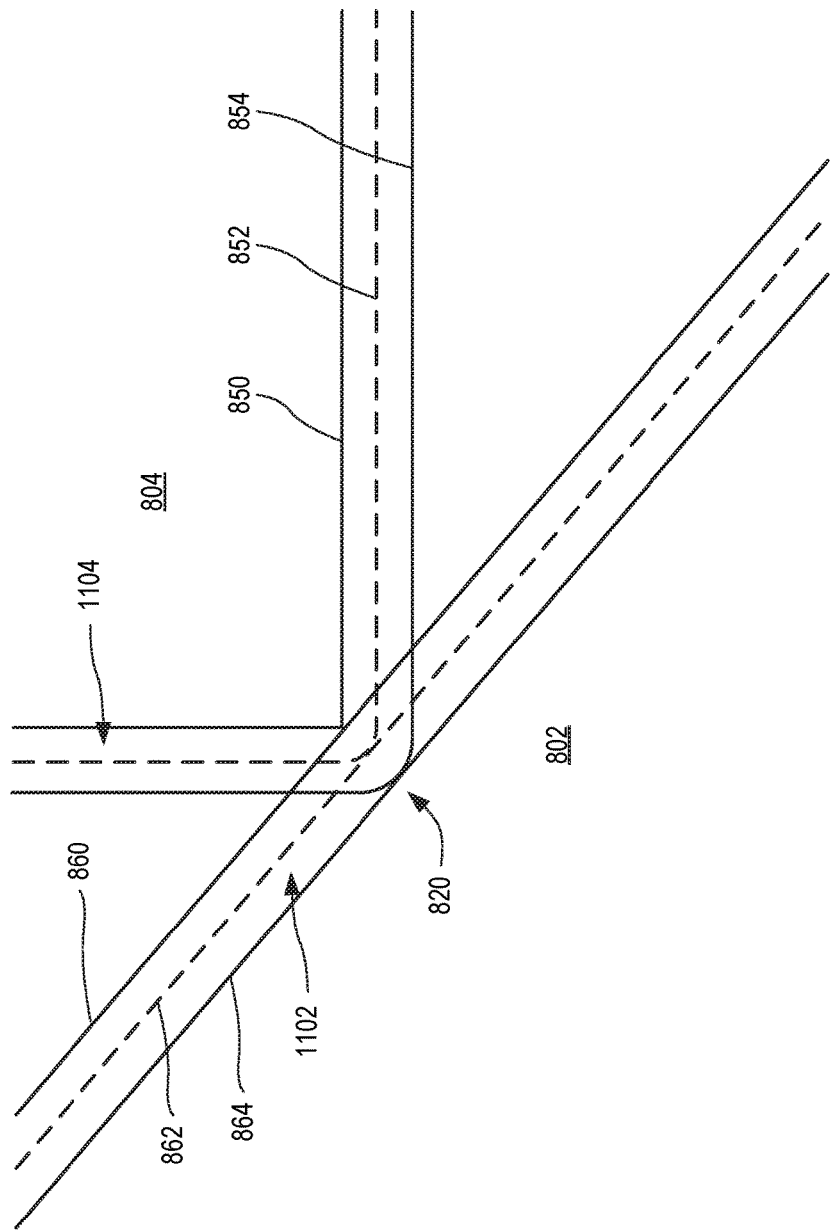
FIG. 11 shows detail of the common cut area of FIG. 8.

Commonly accepted rules in plasma cutting which preclude the sharing or overlapping of common cut areas between adjacent parts (best seen in FIG. 8 and FIG. 11).

There would be guaranteed, substantial and unacceptable part damage, which defeats the whole purpose of production of quality parts by cutting from plate On outside cuts, torch movement is typically restricted to make either all clockwise or all counterclockwise cuts across an entire nest It was believed that the unwanted chamfer from plasma cutting was bad in one direction of cut because the swirl rings gave a direction to the gas and created an asymmetry in the plasma arc.

So in plasma cutting, the torch was set up for either clockwise cutting or counterclockwise where the cutting torch is kept on the left or right of the cut surface at all times.

Cutting on to the left of the part is known as Left Kerf and on the right is known as Right kerf. It was believed that using the wrong kerf direction would result in increased cut width and therefore produce the wrong part size, and often would result in a dramatic slope or bevel to the part edge.

In the prior art, general plasma cutters were setup to cut Kerf Left except in shipbuilding where the tradition was Kerf Right for no specific technical reason.

The cutting torch must be over uncut metal at all times. An attempt to cross a gap will result in the torch going out by losing the arc, in turn causing great disruption as the operator has to restart the program, find the fault point and then attempt a restart the cutting. The part being cut when it extinguished would be damaged and would need to be cut again on yet another nest of parts.

To start the plasma arc, the torch mist be at least 50%-75% over metal and preferably entirely over metal.

If the plasma arc goes over an existing cut, as when closing a full circle, the cut width will increase dramatically in the recut areas if the torch does not extinguish immediately. This cut width increase would damage the part.

The plasma arc cannot start in an existing cut between two parts.

The plasma arc cannot start next to metal unless the torch is substantially or completely over the metal. An established plasma arc would extinguish.

The plasma arc cannot start between two edges of an existing cut.

The cutting torch must exit the part edge on closing a cut contour to prevent substantial damage resulting from increased cut width.

The cutting torch cannot leave a cut path and return along the same cut path without either the torch extinguishing or substantial damage to the part along the original path in terms of cut quality, cut width or chamfer.

Keeping a gap between the cuts creates a skeleton or lattice which can help restrain the parts from movement.

To prevent part movement, the choice of start position was critical to minimize thermal movement from the mechanical advantage of small strips which would push the parts around during cutting, making the cut shape wrong and unacceptable.

Once cutting a profile is started, cutting has to continue until closure.

As a consequence of 1.2 and 1.13 it was not possible to cut in both directions on the one part in sequence.

Also as a consequence of 1.2, 1.13 and 1.16, cutting a profile could not stop and restart—the profile could not be cut in sections.

A pierce on a part edge cannot be done without substantial damage to the part.

Traditional machine generated kerf compensation produced cutting interpenetration between adjacent parts, where part were nominally at a precise gap from one another but would still be overcut by the usual kerf compensated part where sharp corners collided.

Thus, according to these opinions, the overlapped nesting of shapes to use common lines was considered to be totally unworkable and unacceptable for any form of common plasma cutting.

Discovery of Plasma Cutting Possibilities

The following discoveries are based upon experimental observations with a plasma torch, plasma power supply, and a unique NC control based on a motion control NC system program. These observations form the basis of the described embodiments herein that allow shared cutting between adjacent shapes.

In view of the reasons listed above, the following important discoveries have been determined to be true. In many cases, the part damage indicated by the prior art does not occur when starting an arc between two edges of an existing cut. When certain embodiments described herein are implemented, it is possible that traditional cutting with entries and exits is no longer required and huge savings may be achieved without loss of part quality, and perhaps even with improved part quality.

The following list summarizes the discovered possibilities with plasma arc cutting.

Experiments show that there is no need to restrict cutting to only clockwise or counter clockwise format.

Swirl rings no longer appear to be used.

If the kerf offset is changed as required, from left to right, there is no reason to restrict the cutting.

Experiments show that there is no increase in cut width, the part size stays near constant and there is a reduction in bevel.

This restriction to left or right kerf may apply to previous generations of plasma torches and is part of received and taught knowledge, but it is no longer true.

Experiments indicate that the cutting torch can cross a gap without the torch going out, as long as at least the edge of the plasma arc (flame) is on metal Experiments indicate that the plasma arc may be started precisely adjacent to metal with virtually no overlap. This has great implications in edge starts for circles.

The cut width does not increase. Experiments indicate that the cutting torch can travel endlessly around an external contour or an internal hole, even if the metal only remains on one side of the cut, such as when a slug falls out from a cut hole.

The plasma arc can start in a gap between two parts and proceed to cutting instantly. In fact it is imperative that cutting starts immediately to prevent arc damage to two parts. (See later proposed changes to M codes in NC controls)

A plasma arc can start adjacent to metal

Similarly, a plasma arc can start between two previously cut edges, allowing a previous cut to be continued without damaging either part.

The cutting torch does not need to exit the cut path at all. The arc can continue indefinitely within a previously cut path. More critically, it is important to avoid the typical stationary point of the torch where the arc turns off (see changes to M codes in NC controls)

Experiments indicate that the torch may return repeatedly to an existing cut, recut an existing path and may continue without the torch extinguishing and without significant damage to either part. Cut width and chamfer do not increase and in fact chamfer often decreases by removing previously melted metal from the cut.

A skeleton does not adequately restrain parts in plasma cutting. In fact it is the thin parts of the skeleton that can cause movement by creating large forces where only one side of a thin strip is heated to high temperature. The strip deviation unbounded at one end can be shown to be $L^2/W$ where L is the length of the strip and W is the thickness. For the described embodiments, there is no skeleton. It is known that it is important to break up the skeleton in situ not only to prevent thermal movement but also to assist in unloading of the machine and to reduce any need for dangerous manual intervention.

The start point is still important in minimizing movement. The additional tool possible from 2.2 is that the cutting torch may cut in both directions. Further as a consequence of 2.3 to 2.10, it is possible to cut a part in multiple sections, balancing clockwise (CW) and counter clockwise (CCW) cutting directions and restarting precisely so that there is no damage (See later proposed changes to M codes in NC controls #1)

Cutting of a profile may be stopped and started multiple times. The biggest use of this is to counter thermal movement.

As noted in 2.2 above, since the cutting torch can cross a gap without the torch going out, as long as at least the edge of the plasma arc (flame) is on metal, the restriction of rule 1.14 above does not apply and it is possible to cut in both directions on the one part in sequence.

As in 2.12, multi section cutting is not only possible, but advisable in some cases.

Starting on an edge is far less damaging than expected and in principle may not damage parts at all. The damage is vastly reduced if a hole already exists and if the proposed changes to the NC control are made, may result in no damage at all.

It is proposed that kerf compensation is performed by external software and not exclusively by NC controls. Partly because of reason 1.1, many older NC controls do not permit changes of kerf (e.g., from left to right) during execution of a NC Program. Further these older NC controls use an unacceptable type of mathematical construction, even on simple corners, producing a pointy corner that may cut into adjacent parts.

Nesting and Generating NC Code

The nesting of part geometries to use the minimum amount of workpiece to generate the required parts is well known. However, as a consequence of the discoveries and conclusions described above, the embodiments disclosed herein present a completely new way for using an NC plasma cutting machine to cut out parts nested onto a plate using common cutting concepts on nonlinear parts such as discs and such parts where actual overlap of common lines was not envisioned in the prior art.

It is critical to know the precise kerf of the cutting torch when generating the NC program. Once the kerf is known, nesting software, running on a computer having a processor and a memory, may precisely place the parts a cut width or kerf distance apart. In the prior art, parts with common cut lines are placed with a separation equal to the cut width. Prior art systems then spaced other parts more conventionally with a part to part gap that is at least two times the cut width plus a further arbitrary separation. In contrast, using the embodiments disclosed herein, all parts need be separated only by the cut width, such that the cutting overlaps at points where the parts are within a kerf width of each other.

In the prior art, where use of the plate edges was desired, parts that abut the left and bottom edges of the workpiece were placed a kerf radius away from the edge and often much more.

When using the system and method of the embodiment disclosed herein, if possible and additionally, cutting of the nest should commence from the same left or bottom edges. If this is not possible, a traditional pierce and entry may be used. Thereafter, the goal is to avoid piercing again by making use of the cut path of any previously cut part to start cutting the outer boundary of another part. Internal holes in parts may be cut conventionally except that only one pierce is required to form the hole, even when additional parts are to be cut from the material removed from that hole.

Cutting may be restarted in an existing cut without significant damage. This may be done to continue a cut after stopping or to start cutting of an adjoining part with an overlapping cut path.

It has been observed that the plasma arc may be started with the torch positioned slightly off the plate itself, such as when the torch is placed to the side of the plate and immediately next to the plate edge. If the type of plasma torch being used cannot start at the edge of the plate, the plate edge itself cannot be incorporated in the cut part shapes.

When stopping the plasma arc in mid cut, for any of a number of reasons, the torch position is remembered such that the torch may return to this position and restart cutting.

If necessary, the plasma torch may continue cutting along existing previously cut contours, although this would be a waste of time. Unless the distance is short, it would be preferable to stop the plasma arc, move the torch to the desired position on the precut contour, restart the plasma arc and continue cutting.

In disclosed embodiments herein, there is no need to use conventional 'exits' that are diversions of the cutting torch away from the cut line to prevent damage to the part when stopping the plasma arc of the torch. Not only are these exits unnecessary, in a tight nest there may be insufficient room for such exits, or rather, the inclusion of such exits would prevent efficient nesting of parts.

Traditional starts or "entries" may still be used within the disclosed embodiments. These entries may include a full pierce of the material, creating real plate damage a distance from the desired contour or part. These traditional entries should be avoided where possible, but are clearly necessary to form holes in parts and where parts are completely isolated and do not touch other parts.

Using the above methods, in addition to plate savings, which may reach 20%, reduction in scrap, handling, consumables, machine time, and machine service time, there is still the problem that conventional NC control and plasma combinations will leave large holes on the part contour, something which is unacceptable in some markets. Certain embodiments disclosed herein include changes to the NC control itself to reduce such damage to no more than conventional entry and exit damage and perhaps less. Further, part movement from thermally inducted errors may be almost eliminated by dual kerf cutting.

Changes to the Plasma Operation

To get the maximum advantage from the system and methods of the embodiments disclosed herein, or in some cases even to be able to implement these embodiments, changes to the most common plasma torch operations, electronics, and timers may be necessary. Some existing plasma torches may be unsuitable for use with the disclosed embodiments. Firstly, in the case of the torch extinguishing without sufficient cause, the disruption to operations may be so severe that common kerf cutting is unworkable. Secondly, even if the torch continues to operate, unless the end customer is prepared to accept any damage caused at finish of a closed contour, the results may be unacceptable.

Experience indicates that damage caused by the torch has nothing to do with entries and exits and geometry, as commonly believed in the prior art, as will be explained next. In the prior art of plasma cutting, the plasma arc was extinguished to prevent damage to the torch, such as when the torch was determined to be not over metal. Thus, to implement the methods of the embodiments disclosed herein, it is important to avoid turning the torch off completely as an emergency measure to protect the torch. This modification supports the core idea of starting the plasma arc with the torch positioned next to plate and in gaps formed by previous cuts, and of continuing movement of the torch along precut paths while the plasma arc is active.

Changes to the NC Control Operation

Change to the operation of the NC control are generally necessary to permit the operation of a new NC code and to implement a new approach to plasma cutting with high quality complete contours without traditional entries and exits. In the modern world, a dedicated NC control is simply a commercial personal computer running software and, in its simplest form, communicating with Internet type cabling to devices. Inside this modern NC control is a software equivalent to the PLC, the Programmable Logic Controller. Inter alia, this is required to control the motion of the machine and the discrete on/off functions. These on/off functions are controlled by miscellaneous functions in the NC language known as M codes.

The first change is to add a new edge start M code (see edge start 172 of FIG. 1, described below) to force the NC plasma cutting machine to start moving the torch immediately the plasma torch signals that the plasma arc is established. This is to distinguish an edge start from the default pierce start. In this new edge start M code, the cutting torch is ignited while positioned off and adjacent to the edge of the workpiece and immediately starts lateral movement (e.g., movement in the X-Y plane of the NC cutting machine) when the plasma arc is established, as indicated by a signal from the cutting torch. Failure to move the cutting torch immediately the plasma arc is established leaves unnecessary marks at the start of the part contour. This type of M code is unknown on current plasma controllers. This requirement has not been implemented by any known NC control manufacturer.

Similarly, to implement a gap start, an M code (see gap start 174 of FIG. 1, as described below) may be created to allow the cutting torch to be ignited while moving (i.e., without stopping the lateral movement of the torch as done in the prior art). This allows the cutting torch to move along a previously cut path while the plasma arc is ignited without damage to edges formed by the previous cut. Further, to implement these edge starts and gap starts, the M codes do not use or require the common vertical movement (i.e., in the Z-direction of the NC cutting machine) of the cutting torch as used when igniting the plasma arc in the prior art.

The next change is to modify the behavior of the motion controller so that when the torch is turned off, the motion controller does not stop all lateral movement of the cutting torch, which would create a damaged area. Even if not specified, most NC controls stop the motion of the torch to process an M code to completion. While elaborate entry and exit mathematical constructions have been seen over 30 years, few have solved the problem of entry damage. This unknown, unexpected and largely undocumented behavior has been the major cause of damage to parts at a point where the contour closes (e.g., the entry and exit point). This damage may be avoided by changing the NC control (see moving off 176 of FIG. 1, described below) such that when turning off the torch, the torch keeps moving steadily along a previously cut path until the plasma arc is extinguished. Using this newly added functionality, the traditional exit is unnecessary.

Many NC program generators have attempted to turn the torch off immediately before the closure of the cut path that severs the part and have continued torch movement along the cut path or along an exit contour away from the cut path. However, this is generally not sufficient to prevent damage to the part at this point.

A common and perhaps universal problem is that a conventional NC control typically stops the torch after every movement unless there is an action called 'look ahead' which allows the path to continue smoothly, like a car travelling smoothly around a corner instead of stopping at every corner. This optional 'look ahead' function of NC control software, however, is not enough to prevent damage at the point of closure. Unfortunately, an often undocumented feature of NC controls is that the use of a Miscellaneous code or 'M' code, such as used to turn off the torch, also stops this 'look ahead' feature, forcing an unintended and unnoticed momentary stop in movement of the torch at the point where the torch turns off and until the torch off function is complete. This is then followed by the programmed exit movement, which does not have the desired effect, since the torch is already off and the damage has already been caused.

By experimentation, it was found that when using unique software in the NC control, when the torch off M command was placed on the same physical NC program command line as the exit motion geometry, the torch of the NC plasma cutting machine did not come to a complete stop. Such command line construct informs the NC control that the torch off M code and the exit motion were to be performed simultaneously, not sequentially.

Prior art NC controls have additional restrictions that relate to kerf. For example, some prior art NC controls require that they handle the kerf, some use the wrong type of corners for common kerf cutting, and some require the entire nest to be of one type of kerf, say kerf left, and so preclude the use of multiple kerf operations. In the disclosed embodiments, is it generally expected that kerf compensation is calculated by the NC program generator, since the optimum type of required corner can only be generated with complete knowledge of the type of nesting. Also, the amount of gap between parts in nesting clearly requires knowledge of the exact cut width. Casual changes to this gap by operators to compensate for torch consumable wear are not possible in the prior art.

The disclosed embodiments are a combination of mathematics, computer software and understanding of the behavior of steel, plasma cutting and power supplies, and NC controls, for generating an NC program that embodies all the concepts of the embodiments as explained below by reference to the presented figures.

FIG. 1 shows one exemplary idealized two-axis NC plasma cutting machine 140. Machine 140 is shown with a plasma cutting torch 120 and associated drivers 142. For the purposes herein, the machine 140 has two movement axes, an X direction along the machine and down a workpiece 100 and a Y direction across a gantry (not shown). Movement in the Z direction is used to lower the torch for cutting and to raise the torch when not cutting. In one embodiment, machine 140 may include a pantograph bevel head and drive box for moving the torch in the Z, A, and C axes. A workpiece 100 to be cut rests on the cutting bed of machine 140. For the purpose of simplifying the following explanation, the torch 120 is kept vertical at all times, lowered for cutting, and raised when not cutting; the movement axes utilized in NC programming are thus simplified to only X and Y.

Machine 140 operates to cut shapes/parts 110 from workpiece 100. This will leave a skeleton and parts 110 sitting on the bed of the machine for removal. The workpiece is replaced for the next job. These simple machines are now prolific since China started manufacturing in 1990 and now produces around 10,000 such machines a year for a world population of around 300,000 plate and sheet cutting machines. Two axis plate cutting processes include oxy acetylene, plasma, water jet and laser. The embodiments described herein are specific for the increasingly popular NC plasma cutting machines although many of the principles may be applied to oxy acetylene cutting as well.

Torch movement in the axes X, Y is powered by servo motors for precise positioning. These are driven in turn by the appropriately named digital or analog "drivers" and are illustratively shown as drivers 142. These are commanded by a Numeric Control 135, which is typically implemented as a conventional Personal Computer. In the 1970s, NC controls were purpose built computer devices but such are virtually unknown in the modern context although modern computers are often boxed to look like the old dedicated purpose built devices. Most NC controls have been PC based since 2000. The workpiece 100 is cut into parts like 110 as shown in more detail in FIG. 2.

A core idea of this disclosure is based around the generation of an NC program 136 (e.g., by NC program generator 138) that directs cutting machine 140. NC program 136 is read and understood by NC control program 137 of Numerical Control 135. The NC program 136 is a human readable series of Geometric moves (G codes) that control movement of torch 120 of NC plasma cutting machine 140 and Miscellaneous functions (M codes) that turn components (e.g., the arc of torch 120) of NC plasma cutting machine 140 on and off.

NC program 136 is created by NC program generator 138 that may operate within NC control 135 or within any other computer. NC program generator 138 implements certain embodiments described herein to generate NC program 136 for execution by NC control program 137 of NC control 135 to control movement of torch 120 of NC plasma cutting machine 140 to cut parts 110 from workpiece 100. More particularly, NC program generator 138 utilizes the geometry of a plurality of parts 110 to generate a nest 139 of the parts, and then generates NC program 136 such that when executed by NC control program 137 of NC control 135, NC program 136 controls NC plasma cutting machine 140 to cut the parts from the workpiece 100.

In operation, NC program 136 is executed (i.e., read and followed) by NC control program 137 within NC control 135 to direct all the geometric movements of NC plasma cutting machine 140 in axes X, Y through the drivers 142 which control the servo motors to make the movements. NC program 136 contains information for controlling and directing machine 140 and most importantly it includes information for turning the plasma torch 120 on and off as required.

NC program generator 138 generates nest 139 to increase workpiece utilization dramatically by positioning contours of parts 110 to use cut path overlaps between adjacent parts. The gain in productivity provided by this nesting optimization alone is adequate for some markets where part quality is less important than plate utilization. For markets where plate is relatively cheap and part quality is a high priority, improvements to the Miscellaneous or M commands implemented by NC control program 137 within NC control 135 and used by NC program 136 eliminate damage areas, specifically at the locations where the torch turns on and off. In certain cases, a change to the plasma supply (not shown) which powers the torch 120 may also be required. The proposed changes to the M codes are understood by one of ordinary skill in the art, but the impact and need for these changes has never been previously set out. No changes are needed to plasma torch 120 and associated plasma power supply for one common brand of torch, as used in testing, but changes may be required to other current plasma suppliers.

As shown in FIG. 1, NC control program 137 of numeric controller 135 is improved by adding new M codes 170 that include an edge start M code 172, a gap start M code 174, and a moving off M code 176. As described above, edge start M code 172 ignites cutting torch 120 while positioned off and adjacent to the edge of the workpiece and immediately starts lateral movement (e.g., movement in plane formed by the X-Y axies of NC cutting machine 140) when the plasma arc is established, as indicated by a signal from cutting torch 120, to prevent unnecessary damage/marks at the start of the part contour. The gap start M code 174 allows cutting torch 120 to move along a previously cut path while the plasma arc is ignited to prevent damage to edges formed by the previous cut. The moving off M code 176 does not stop all lateral movement of cutting torch 120 when the arc is being extinguished, thereby avoiding a damaged area as caused by a stationary arc.

These new M codes 170 add new capabilities to numeric control 135 that may be invoked from NC program 136. That is, NC program 136 may be generated by NC program generator 138 to include new M codes 170 to improve cut part quality and nesting efficiency when cutting parts 110 from workpiece 100.

Figure 2:
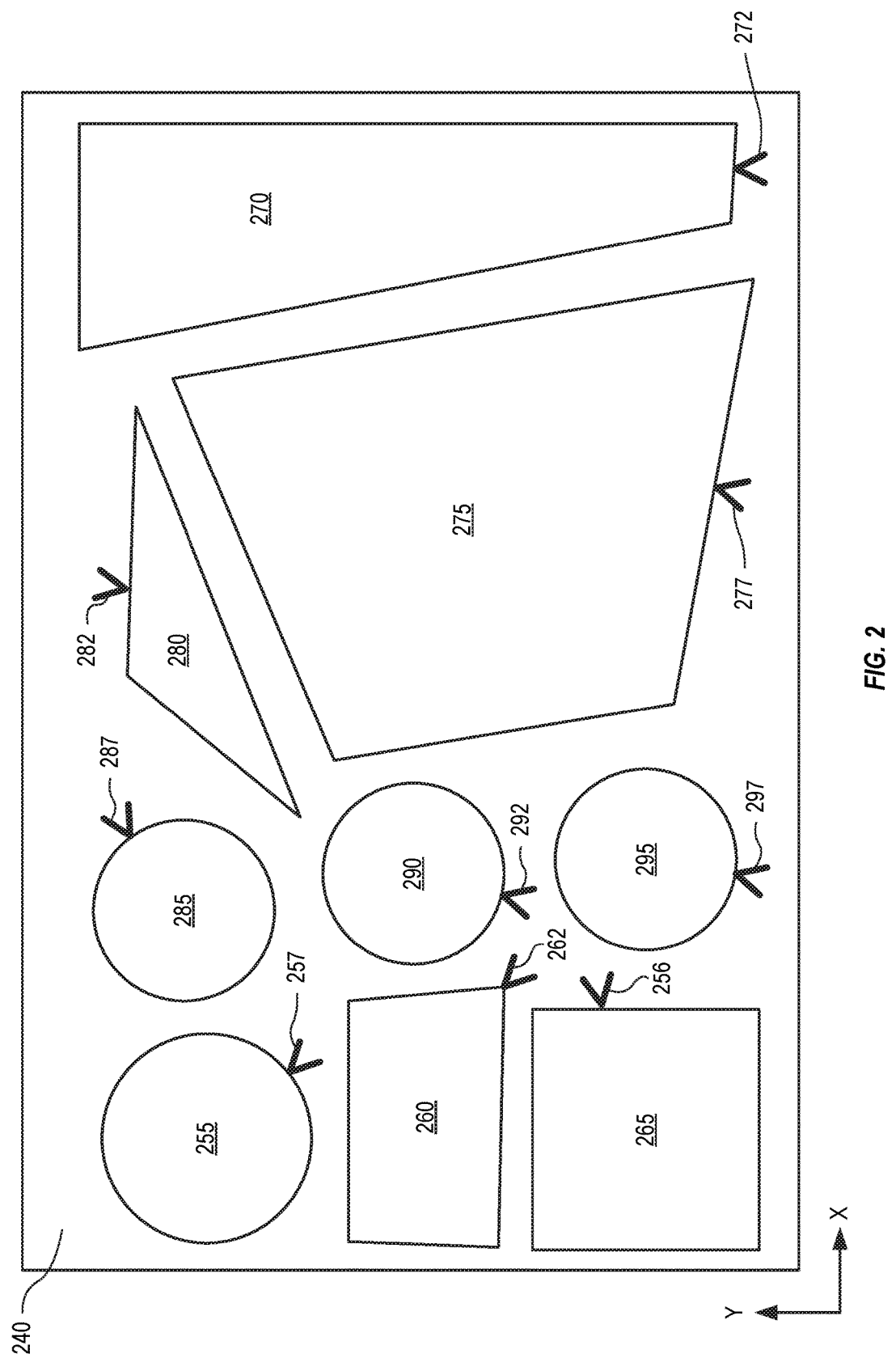
FIG. 2 shows example nesting of parts with traditional entries and exits, one per part.

FIG. 2 shows nine required parts 255, 260, 265, 270, 275, 285, 295, 280, 290 on a workpiece 240. This assembly of parts on a plate is known as a nest. Traditionally, the plasma cutting process, and in fact most cutting processes, requires piercing of the plate 240 for each and every part. This is done for a number of reasons, the most important of which is to keep the parts geometrically separate in the remnant matrix or skeleton so they do not affect each other and such that cutting of one part does not damage neighboring parts. As noted above, the piercing process is much more damaging than the cutting process, leaving big holes as the material is blasted away to achieve penetration prior to cutting the shape. Therefore, the distance of the pierce from the desired shape is often equal to the thickness of the material and may be quite large, say 50 mm. Another reason for individual pierces is to prevent or minimize thermal movement by keeping the skeleton intact as a limit on part movement under heat. The torch reaches 10,000° C. to melt the plate material, and thus the edge of the cut also reaches high temperatures, causing thermal expansion.

For every entry, there is usually an exit movement known as an 'exit'. The exit allows the torch to move away from the part contour to prevent damage to the part by the torch when the part is severed from the plate. FIG. 2 shows the nine parts 255, 260, 265, 270, 275, 285, 295, 280, 290 each with corresponding notional pairs of entries and exits as 256, 262, 257, 287, 292, 297, 277, 282, 272, respectively.

As noted above, piercing is very wasteful in many ways. Even in the fast plasma process it may take from 2 to 15 seconds to achieve penetration. The pierce also results in an explosion of molten metal back at the torch, which is the single greatest reason for having to regularly replace torch components—known consequentially as consumables. In the US, a single torch typically requires $20,000 of consumables each year. A single plasma pierce has been estimated as costing $2.

An even bigger cost results from the waste of material between parts. In the prior art, potentially highly efficient nest patterns are geometrically disturbed by the required entries and exits that force additional spacing between parts, thereby wasting more plate. The logic behind the ideal position and shape of entries and exits has baffled, entertained, and cost the industry for decades as various manufacturers, software suppliers and exponents argue over the ideal shape and logic. The embodiments described herein disclose new concepts: the 'edge start' (see edge start M code 172) and the 'gap start' (see gap start M code 174). The consequential savings in consumables, cutting time, material, reduced scrap, and handling are potentially immense at 4% to 20% of all plate and sometimes 50% of consumables and 50% of cutting time.

Various techniques have been adopted over time to reduce the need to pierce, including Common Cutting, Bridging, Negative Bridging, Paired Common Cut parts and more.

In scale, steel is approximately $US 600 a ton. A typical full time NC cutting machine may cut three tons of steel a day and thus 750 tons a year, say $450,000. A 4% to 20% saving in plate will yield a saving of $18 k to $90 k in material costs alone. The balance in cost savings changes from country to country, but as a world commodity, steel savings is by far the higher priority in other countries where wages are far lower.

Automatic nesting software systems have been produced by perhaps two-hundred companies, but they cannot improve nesting efficiency past a certain point. The embodiments disclosed herein are able to take any given nest of parts, no matter how produced, and improve plate utilization dramatically and potentially with no loss of part quality.

Figure 3:
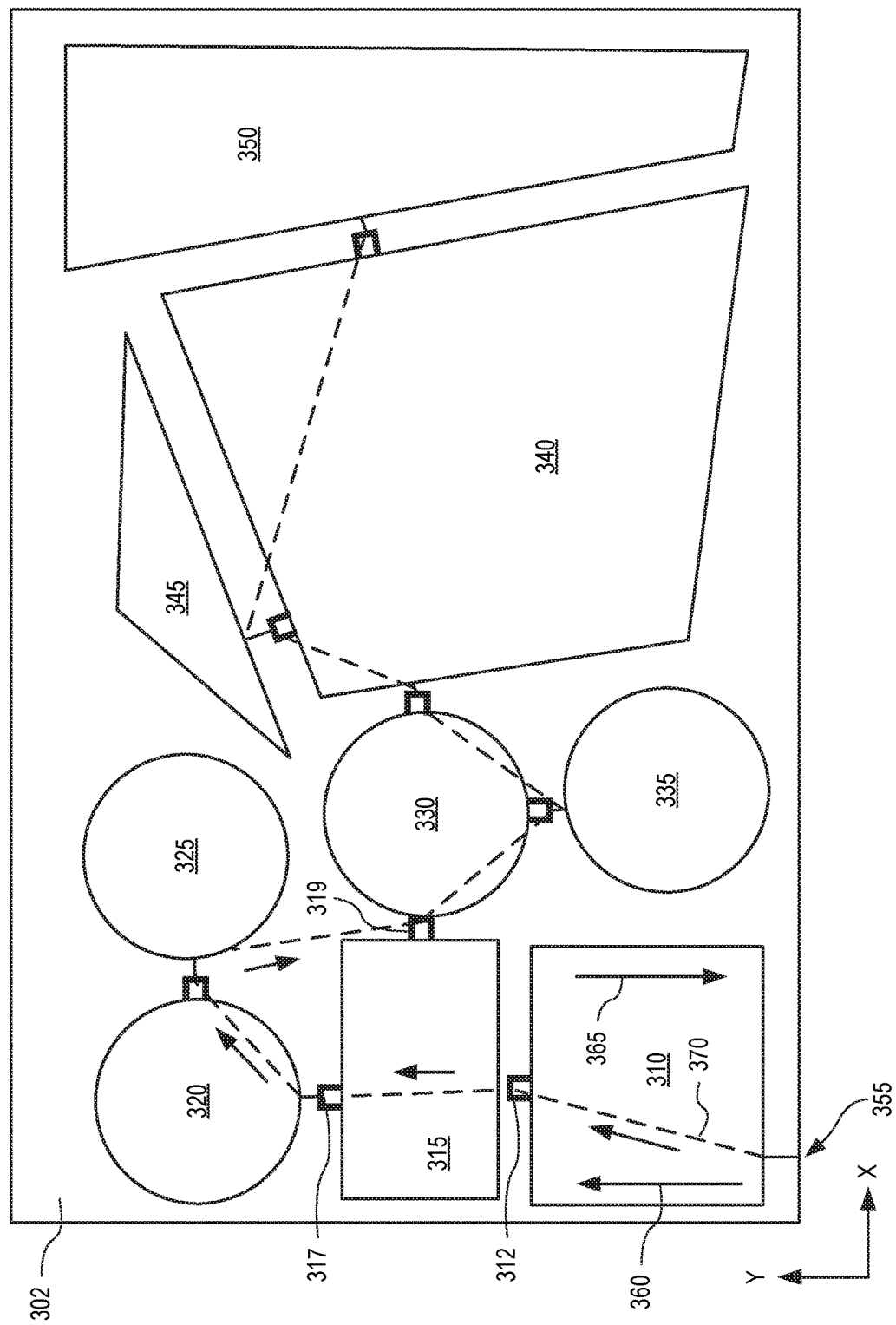
FIG. 3 shows example nesting of parts showing added opportunities to eliminate external pierces.

FIG. 3 shows one exemplary solution that involves the creation of keyholes or 'opportunities' while cutting as a solution for elimination of most external pierces. However these solutions are still based on a number of old ideas. Notably, the idea of starting a cut on the edge of the part itself is excluded because of the expectation, and experience, of part damage resulting therefrom. In the embodiments disclosed herein, edge starts are used and, with the proposed changes to the plasma and NC control logic, the quality of cut parts equal or exceed the quality obtained by traditional cutting with entries and exits. Even without the proposed improvements to the plasma and NC control logic, the damage to the parts is a commercial decision and may be acceptable.

Specifically in FIG. 3, the parts 310, 315, 320, 325, 330, 335, 340, 345, 350 are to be cut from plate 302. Note that for the purpose of discussion, the parts are shown without holes. Nesting is about the outer profile generally unless a hole within a part is large enough to accommodate another part, and even then the same rules apply.

In the example of FIG. 3, an NC program is generated and cutting starts from the edge at 355. The torch is then controlled, by the NC program, to cut rectangle 310, performing a clockwise circuit around the part (as indicated by arrows 360 and 365) and cutting an opportunity 312 (a shaped hole), carefully avoiding leaving the part completely and resuming cutting smoothly without leaving a mark on the part near opportunity 312

Upon finishing cutting of part 310, the torch is turned off and moved (indicated by dashed line 370) to opportunity 312. Part 315 is then cut by starting the torch on the edge of opportunity 312 (away from part 310) and cutting part 315, this time creating two further opportunities 317 and 319. That is, the NC program is generated to create opportunities 312, 317, and 319 to enable parts to be cut without the need to pierce workpiece 302. In turn, opportunities 317 and 319 are used to cut parts 320 and 330. And so on, avoiding any piercing at all. As shown in FIG. 3, the entire nest of parts may be cut without torch damaging and plate consuming pierces. There are other considerations in placement of the opportunities and the direction of cutting. However, the overriding concern here was to eliminate pierces without consuming additional plate beyond the minimum separation between the parts. This allows for nesting without entries and exits and positioning of entries and exits where possible after nesting, as the distance taken up by the opportunities is typically 2× cut width and not the plate thickness.

Figure 4:
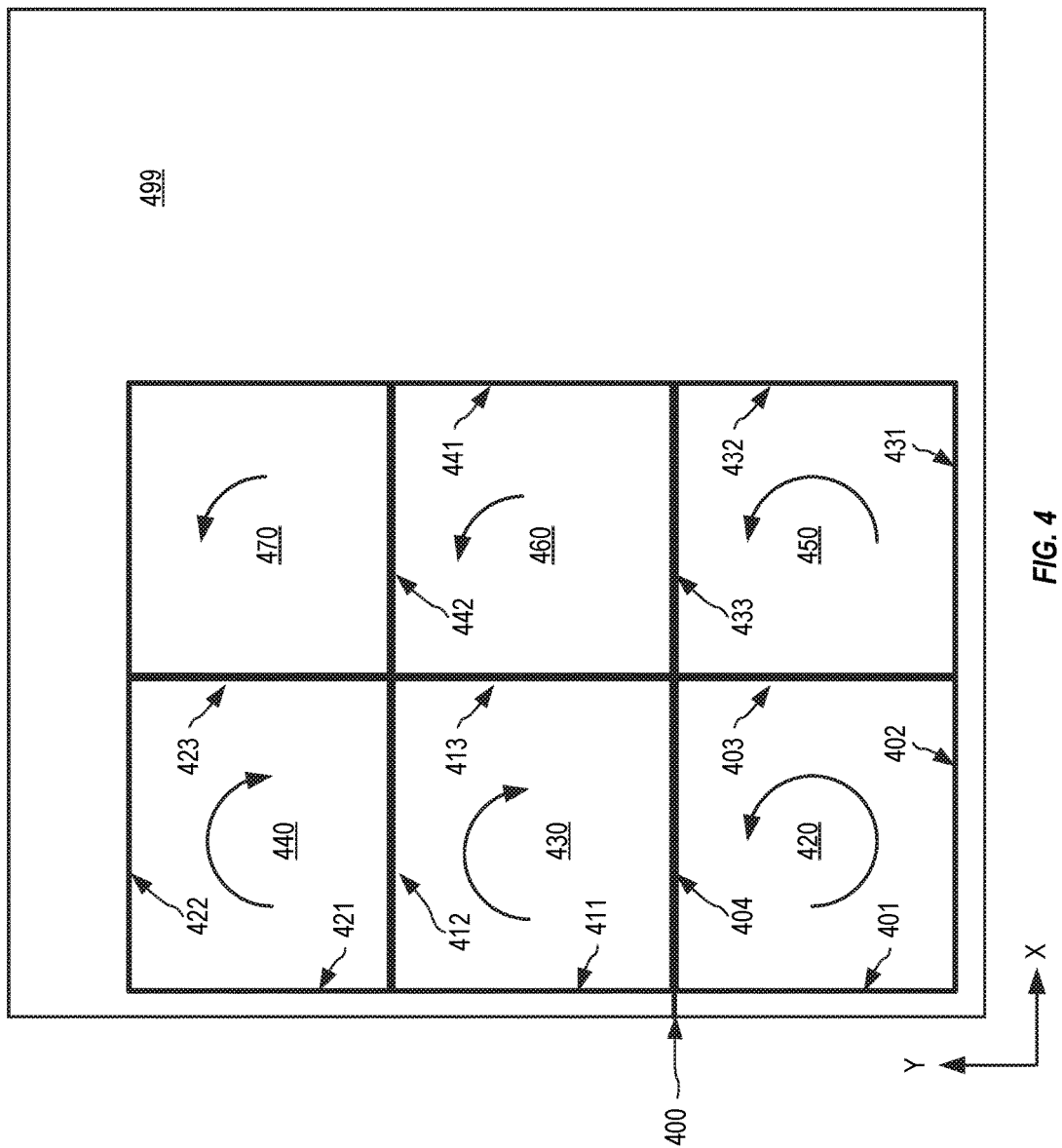
FIG. 4 shows example common line cutting for a nest of six rectangles.

FIG. 4 shows exemplary common line cutting for a nest of six rectangles. The plate 499 is to be cut to produce six identical rectangles, 420,430,440,450,460,470. There could be a saving by abutting these rectangles perfectly separated by precisely the cut width so that they share common cut edges 403, 404, 412, 413, 423, 442, and 433, which only have to be cut once. This clearly saves time and material, with the cost of typically having to restart on the plate edge with consequential damage. Without edge start technology, this will require a full and damaging pierce but in some applications such as footplates, this does not matter except aesthetically. This is a commercial decision.

In the example of FIG. 4, note that the edge of the plate 499 is not used, typically because the customer will not accept the plate edge as a part edge, although this is one variation explored later to save even more time and material.

In common cut lines, cutting of the plate 499 starts at 400 and proceeds with cutting edges 401,402,403, 404 to complete part 420 with four sides. Cutting then proceeding with edges 411, 412 and 413, which frees the second part 430 with cuts only to three sides. Starting on edge 421 in a clockwise direction, cutting of edges 422 and 423 frees the third part 440. Similarly, starting on edges 431, 432, 433, cutting frees the fourth part 450 with cuts to three edges of the rectangle. To cut part 460 requires cutting of only two edges 441 to 442, a two sided rectangle, and similarly with part 470.

The direction of cut may be varied to minimize heat movement. So we have two clockwise cuts and four counter clockwise. As previously explained, this was expected to further degrade part quality as most plasma machines are setup to cut in only one direction.

So a total of 6 squares have been formed by cutting a total of 4+3+3+3+2+2=17 edges instead of 24 edges, a substantial saving of 30% of cutting time and perhaps a further 10-20% of material depending on the ratio of cut width and part spacing to part size in a traditional nest such as shown in FIG. 2.

Additional columns would increase the savings and a large number of such shapes could be cut with a total cut saving approaching 50%. An alternative technique is to program the cuts horizontal and vertical in sweeps, but this is rarely done because of potential large movement between passes.

Figure 5:
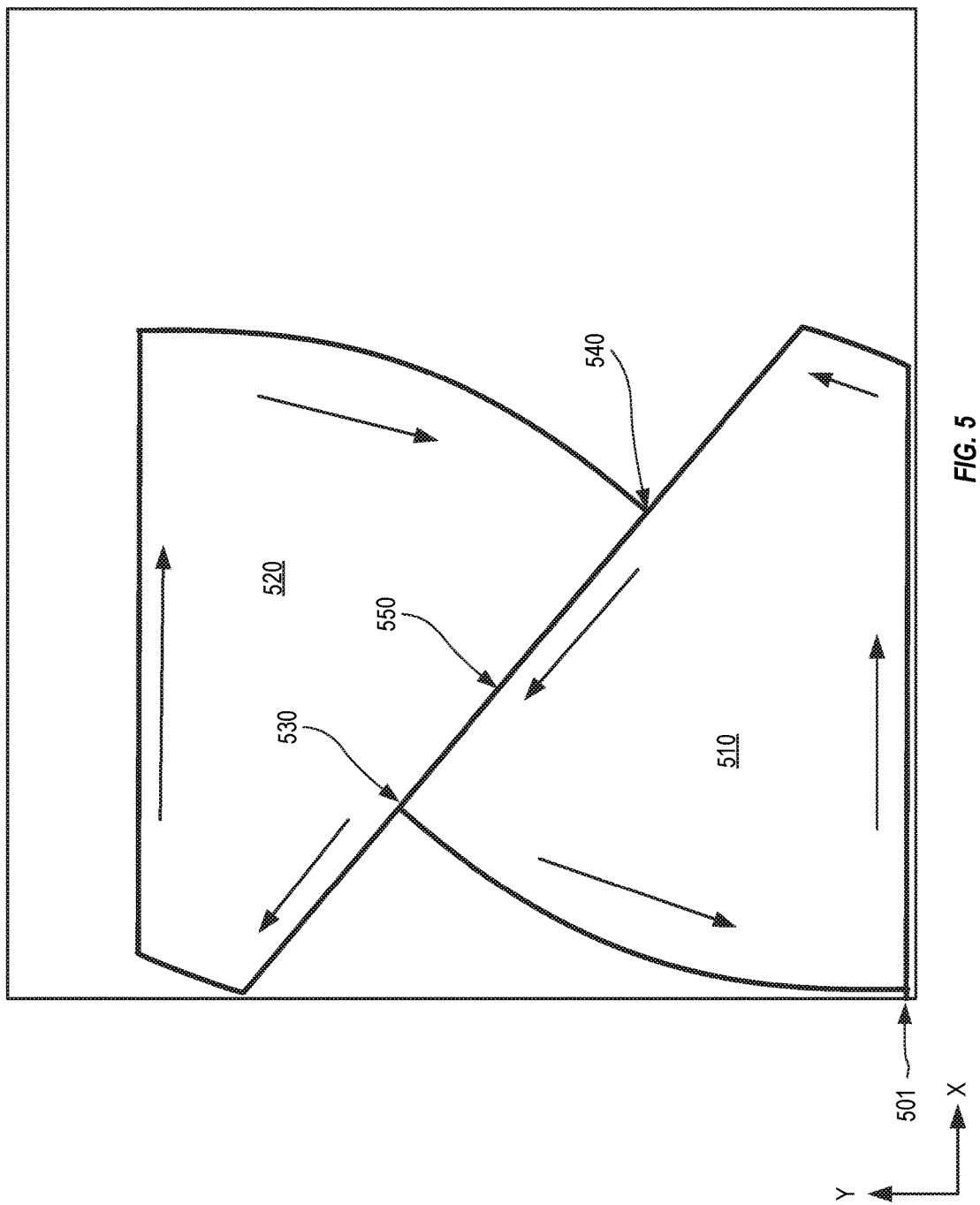
FIG. 5 shows example common line cutting with casual partial overlap and non-rectangular parts.

Common cutting ideas may be extended to areas where the total saving in cutting time is less significant, or zero, but where there is a saving in material. FIG. 5 shows exemplary common line cutting with casual partial overlap and non-rectangular parts. FIG. 5 illustrates the torch cutting paths and part edges are not drawn for clarity of illustration.

Cutting starts at 501 and the cut progresses counter clockwise to free the first part 510. For the second part 520, an edge start is required at 530 and cutting proceeds clockwise, ending at 540, since edge 550 is already cut. The savings here are far less in time and highly variable depending upon the amount of partial overlap. Determining the partial overlap, even for straight sides, makes for complex analysis. In the prior art, the edge start required to cut the second part 520 raises the specter of undesirable part damage. In the prior art, changing cut direction is also considered to produce unacceptable variations in part quality and size, so this type of cutting is unobserved. With the embodiments described herein, the changing cut direction and edge start is no-longer a concern or deterrent from cutting parts with partial overlap as shown in FIG. 5.

Figure 6:
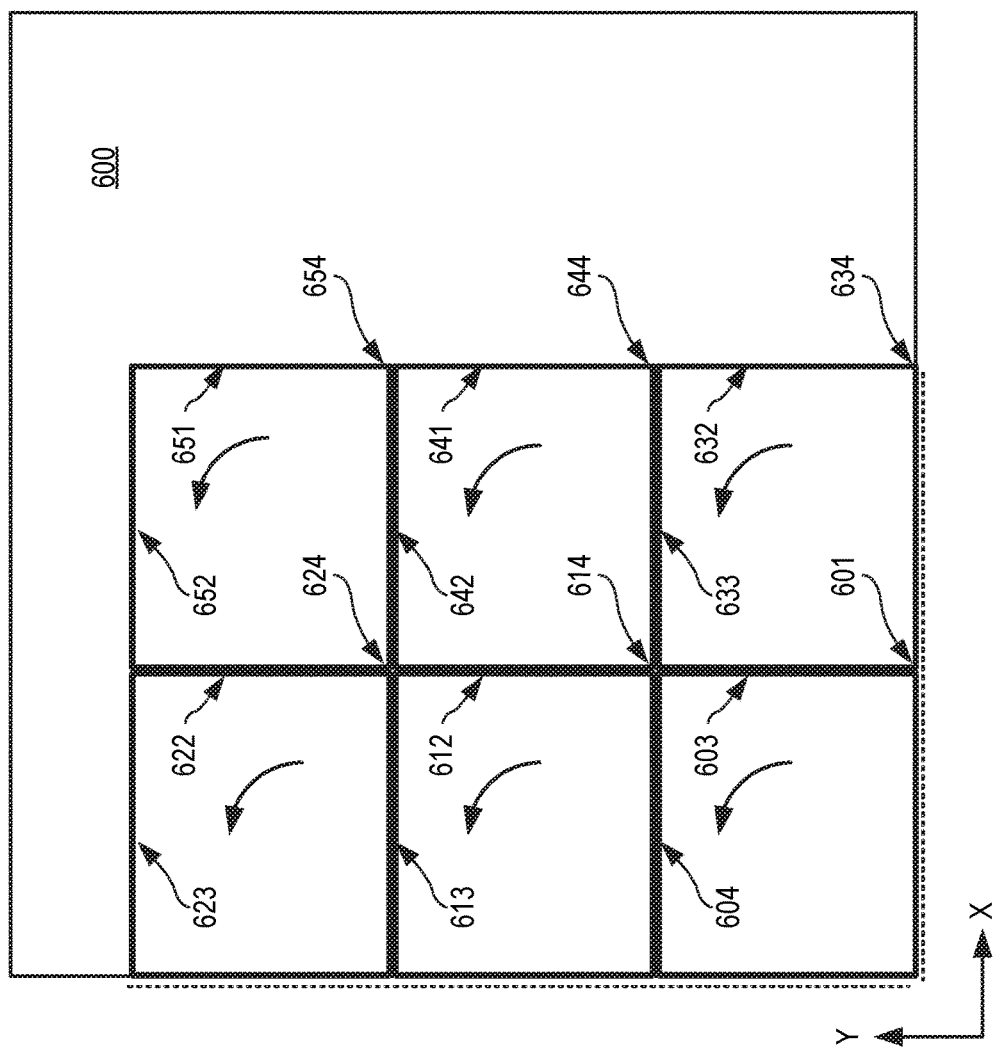
FIG. 6 shows example common cutting using the plate edge and bottom.

FIG. 6 shows a variation on the classic common cut nest. It differs in only one respect, the bottom and left straight edges of plate 600 are used as part boundaries. The area which is not cut is highlighted by dashed lines and it can be seen that there is a lot less cutting involved to separate the six parts from the plate.

Cutting is less, with only 2 cuts per part. Starting on the plate lower edge at 601, cutting lines 603 and 604 and the part is complete. Similarly starting at 614, 624, 634, 644 and 654, each other part is completed by cutting pairs of edges 612, 613, 622, 623, 632, 633, 641, 642, 651, 652, respectively. Each part has only two cuts, requiring 50% of the traditional cutting, plus the fact that the remnant is a simple L shape with no scrap at all to handle.

This sort of cutting makes use of the fact that the plate is often square cut, but does not rely on the exact dimensions as delivered plates are always over specification size, so only two edges may be trusted. This saving also requires either precise alignment on the start or a laser based alignment to rotate the programmed axes of the machine to match precisely those of the plate. This facility is increasingly common.

Figure 7:
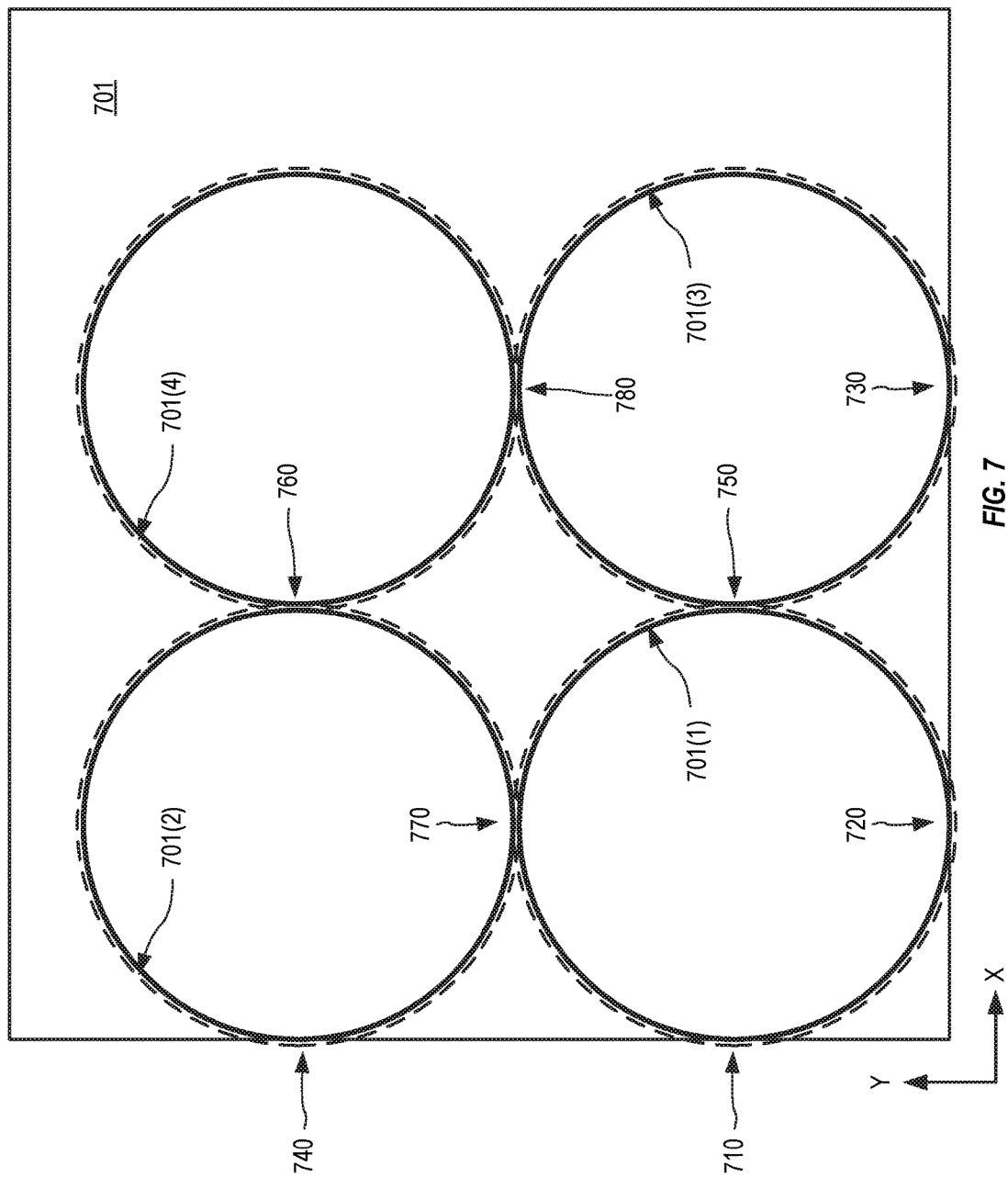
FIG. 7 shows example common cut circles with shared cut areas and use of the left and bottom plate edges, in an embodiment.

This idea of using the plate edge has been suggested for rectangular parts. However as described below, it may also be applied to non-straight edged parts as shown in FIG. 7, something which is far from obvious. This matters where the savings in material are far more important than the time savings.

FIG. 7 shows exemplary common cut circles with shared cut areas and use of the left and bottom plate edges. The nest for cutting four simple discs from plate 701 shown in FIG. 7 is a key example of how the disclosed embodiments overcome many of the previously accepted rules of NC plasma cutting. FIG. 7 shows cut width paths 701(1)-(4) of the torch, where the dashed lines represent an outer edge of the cut width and the solid line represents an inner edge of the cut width. At location 740 for example, the torch center and thus the entire plasma arc is off the plate while the inner edge of the cut path 701(2), or disc boundary, exactly touches the plate edge.

Given the nest shown in FIG. 7, the following points discuss the expected cutting of the parts from the viewpoint of the prior art:

The cutting starts at point 710 off the plate but adjacent to it. This is considered impossible in the prior art.

Then at points 720, 730 and 740 and nearby, the torch leaves the plate meaning that in the accepted wisdom the torch will go out and the machine stop.

Even if the torch continued to cut, there is the expectation that the circularity of the part would be adversely affected.

At points 750, 760, 770, and 780, the cutting paths completely overlap, raising major issues of increased cut width, torch extinguishing, increased edge damage and beveling, and excessive part movement as there is no skeleton to restrain hot parts.

As cutting continues, some parts are completely unrestrained and would move substantially, destroying the circularity of the parts.

In three cases, the torch would have to restart in the existing cut, something which is held to be impossible.

In three cases, the torch would have to travel into an existing cut which is considered impossible as there is no metal at all under the torch.

One of the primary rules of plasma cutting in the prior art was that metal is required to be under the torch at all times while cutting. However, using embodiment disclosed herein and discussed above, experimentation has successfully cut such a nest of parts in exactly this configuration and the results were near perfect.

FIG. 8 shows an even more extreme case of 'Common Kerf Cutting' as distinguished from 'Common Line Cutting' shown in FIGS. 4 & 6. In the example of FIG. 8, there is actually no great area of edge overlap of parts 802, 803, 804 on plate 801. However, parts 802, 803, and 804 are nested such that their cut widths overlap completely at three touching points 810, 820, and 830. These areas are common cut only at these touching points. In the prior art, such nesting of parts with touch points was not done because of 'lost' or interruption of the plasma arc, expected very poor cutting in the overlap area, and even no cutting in the overlap area, and all the usual concerns as previously described. However, in certain regions and for applications where cut edge quality is far less important than total steel consumption, this type of nesting has great advantages over previous concepts and provides big savings in plate usage, when implemented as described in the embodiments hereof.

FIG. 11 illustrates the complex area of cut path overlap at point 820 for parts 802 and 804 of FIG. 8. A first cut path 1102 around part 802 has an internal contour 864, an external contour 860, and a dashed center line 862. A second cut path 1104, has an internal contour 850, an external contour 854, and a dashed center line 852. Each outer and inner contour 860, 854, 864, 850, is one kerf radius away from its center line 862, 852, respectively. Note for example that the innermost shape of part 804 is rectangular, since the final shape required is a precise square. Inner shape contours 864, 850 form the future edges of parts 802 and 804. There is substantial significance in the radius of cutting path 1104 at location 820, since a square corner would actually penetrate shape 802, thereby destroying its contour integrity.

It is further critical that contours 854 and 860 do not enter the part boundary of the adjacent parts 802 and 804 respectively. The value of making the corner of center line 852 at location 820 a radius is immediately apparent. It is also important to note that many NC controls that are responsible for kerf compensation often do not use a radius but a straight line projection with a possible truncating line for very acute corners. In this way many existing NC controls are unsuitable for use with the embodiments disclosed herein, at least with kerf compensation that is calculated as a function of the NC control.

Figure 9:
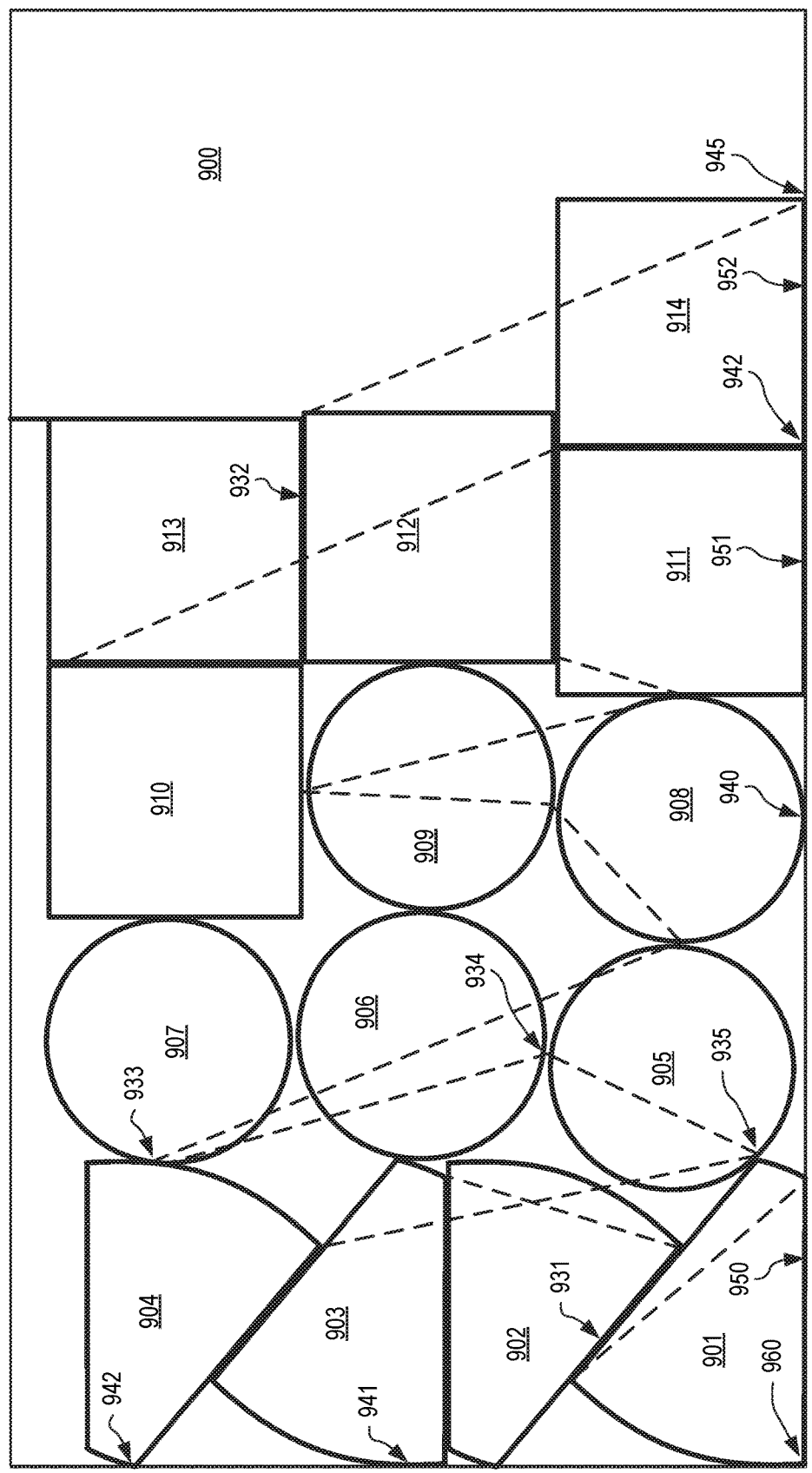
FIG. 9 shows example mixed common cutting with straight line overlap, partial overlap and touch point overlap, in an embodiment.
Figure 10:
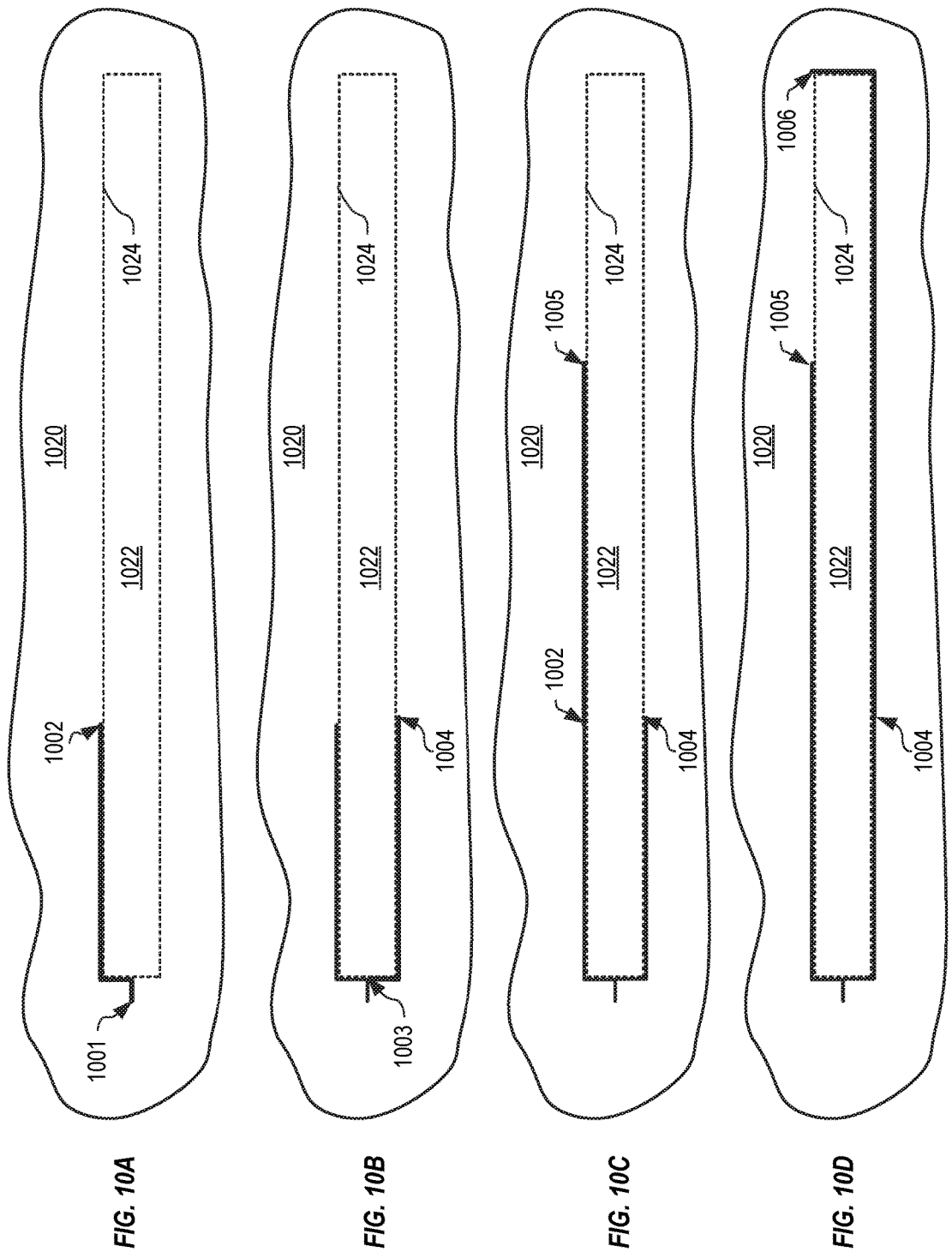
FIGS. 10A-D show an example sequence of cutting a long thin part from a plate in stages with restart on the path and bi-directional cutting, in an embodiment.

FIG. 9 shows a more complex nest of fourteen parts having three quite different shapes and demonstrates the mix of common lines partially overlapped as 931 and full overlaps such as 932. It also demonstrates the use of the plate edge as part edges 950, 951, 952, which are not cut at all, thereby reducing cutting time. At locations 941, 942, and 940, the cutting torch center and thus the entire plasma arc actually leaves the plate 900. This is not an essential aspect of the invention though and an overlap is advisable to avoid the possibility of the plasma arc stopping unexpectedly.

In the embodiments disclosed herein, use of the plate edge requires perfect alignment of at least the left hand and bottom edges. Total plate size cannot be assured and opposite edges cannot be assumed to be parallel as plates are typically delivered slightly oversize. The embodiments herein, however, assume that the plate has at least two trusted edges to produces additional and worthwhile savings.

Note also that, using the embodiment disclosed herein, there is not a single pierce required to cut the entire nest of parts 901, 902, 903, 904, 905, 906, 097, 908, 909, 910, 911, 912, 913, and 914 of FIG. 9. An edge start at 960 leads to cutting of part 901, and further edge and gap starts complete the nest including for example gap starts at 933, 934, 935, and edge starts at 940, 942, and 945. Dashed lines show the movements of the cutting torch from part to part without cutting. For example, when part 901 is completed, the torch is raised and proceeds to cut part 902 starting at the end of already cut line 931 with a gap start.

FIGS. 10A-D show an exemplary sequence of cutting a long thin part 1022 using a cutting path 1024 from a plate 1020, a portion of which is shown, in stages with restart on the path and bi-directional cutting. As thermal distortion produces movement based upon $L^2/W$, it is not desired to cut too far along one side of the long thin part 1022, since the thermal difference would result in bending. In the prior art, such shapes were either not cut or were cut with two specially setup torches a fixed distance apart that cut two paths simultaneously to balance thermal movement.

With the embodiments disclosed herein, it is possible to cut these long thin parts in balanced stages. Firstly a cut is started at location 1001 and proceeds along cutting path 1024 to location 1002, where the plasma arc is stopped. Then, the cutting torch is moved to location 1003, restarted, and a cut is made along cutting path 1024 to location 1004 and the plasma arc is stopped. Then, the torch is moved back to location 1002, the plasma arc is restarted along the center of the cut path with a moving gap start, and cutting is resumed from location 1002 along cutting path 1024 to location 1005 where the plasma arc is stopped. Then the torch is moved back to location 1004, the plasma arc is restarted along the center of the cut path with a moving gap start, and cutting is resumed from location 1004 to location 1006, where the plasma arc is stopped. The final cut is made from location 1005 to location 1006 using a similar technique. While this takes five moves say, the end result should be a very straight long thin piece of steel and not one distorted and bent. The bending formula may be used to calculate a limit for an acceptable distance to cut on one side before stopping and cutting the other side.

The principles outlined in the embodiments disclosed herein allow for great saving of workpiece material, time, and costs, in the production of parts from flat metal sheet or plate using plasma torches. To achieve maximum quality when cutting these advanced nests, the proposed changes to the plasma torches and the NC control for the edge starts and moving gap starts and stops should be implemented such that any requirement to have entries and exits at on external boundaries may be totally eliminated.

Figure 12:
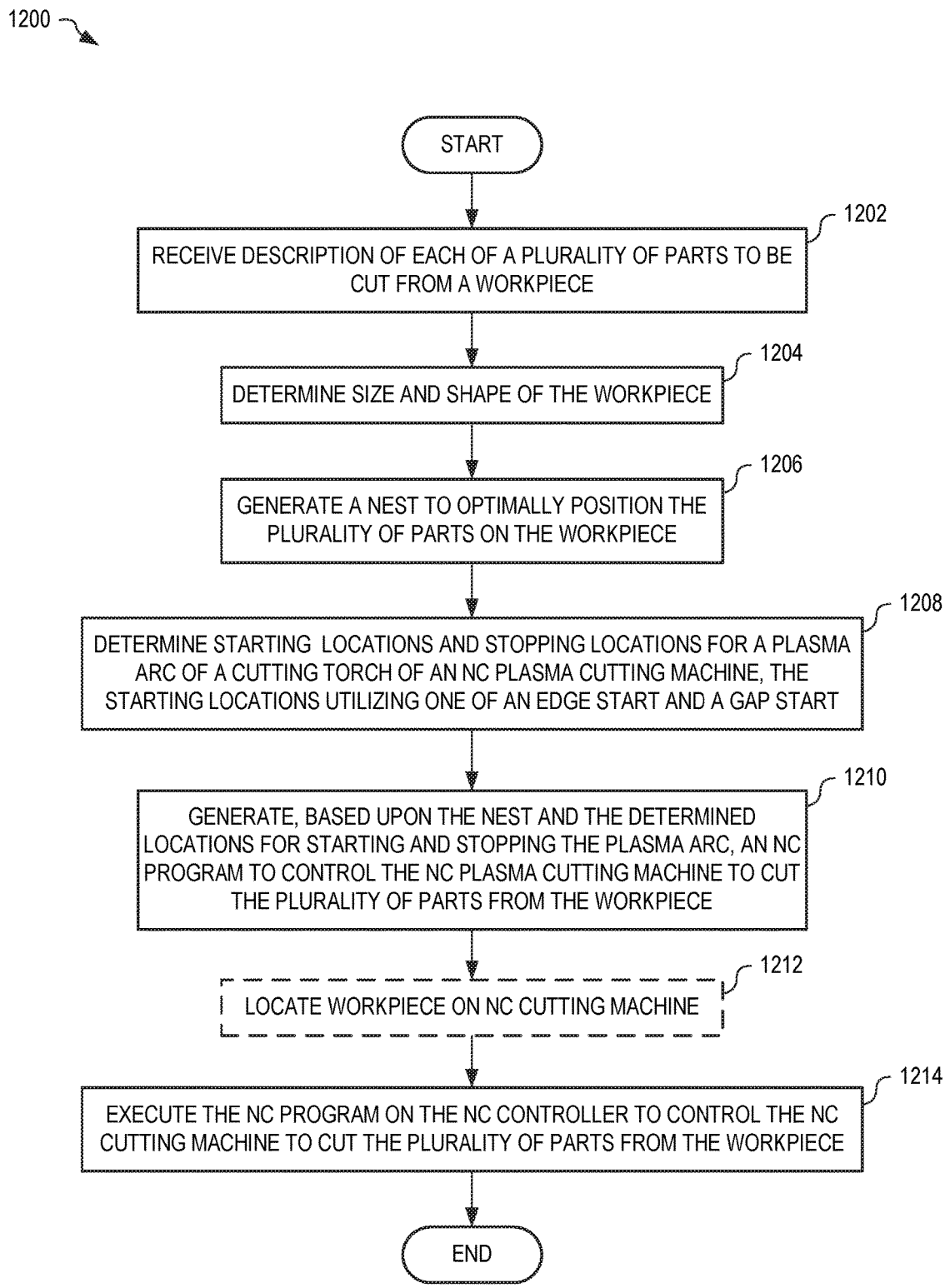
FIG. 12 is a flowchart illustrating an example method for NC plasma common cutting of non-rectangular nested parts, in an embodiment.

FIG. 12 is a flowchart illustrating one exemplary method 1200 for NC plasma common cutting of non-rectangular nested parts. Method 1200 is implemented in NC program generator 138 of NC control 135 for example.

In step 1202, method 1200 receives a description of each of a plurality of parts to be cut from a workpiece. In one example of step 1202, NC program generator 138 receives contours for each part 901-914 to be cut from workpiece 900. In step 1204, method 1200 determines a size and shape of the workpiece. In one example of step 1204, the size and shape of workpiece is measured on NC cutting machine 140 using a laser measurement tool. In another example of step 1204, NC program generator 138 receives data defining the shape and size of workpiece 900 from a user of NC control 135.

In step 1206, method 1200 generates a nest to optimally position the plurality of parts on the workpiece. In one example of step 1206, NC program generator 138 uses method 1300 to generate nest 139 to position parts 901-914 on workpiece 900, optimizing based upon one or more of: minimize a number of pierce starts, maximize common line cutting, minimize overall cutting path by aligning contours of one or more parts with an edge of the work piece, and minimize waste of workpiece 900. In step 1208, method 1200 determines starting locations and stopping locations for a plasma arc of a cutting torch of an NC plasma cutting machine, the starting locations implementing one of an edge start and a gap start. In one example of step 1208, NC program generator 138 determines locations for starting the plasma arc of cutting torch 120 based upon positioning of parts 901-914 within nest 139 relative to workpiece 900, wherein locations for edge starts are determined for parts having a contour proximate an edge of the workpiece, and locations for gap starts are determined for parts having a contour proximate a contour of a prior cut part. In another example of step 1208, NC program generator 138 determines locations for stopping the plasma arc based upon one or more of part contours, prior cut paths, and contours corresponding to workpiece edges.

In step 1210, method 1200 generates, based upon the nest and the determined locations for starting and stopping the plasma arc, an NC program to control the NC plasma cutting machine to cut the plurality of parts from the workpiece. In one example of step 1210, NC program generator 138 generates NC program 136 based upon nest 139 and the determined starting and stopping locations of step 1208.

Step 1212 is optional. In step 1212, if included, method 1200 locates the workpiece on the NC cutting machine. In one example of step 1212, an operator of NC cutting machine 140 positions and locates workpiece 900 on NC cutting machine 140. In step 1214, method 1200 executes the NC program on the NC controller to control the NC cutting machine to cut the plurality of parts from the workpiece. In one example of step 1214, NC program generator 138 initiates execution of NC program 136 on NC control 135 to cut parts 901-914 from workpiece 900 on NC cutting machine 140.

Figure 13:
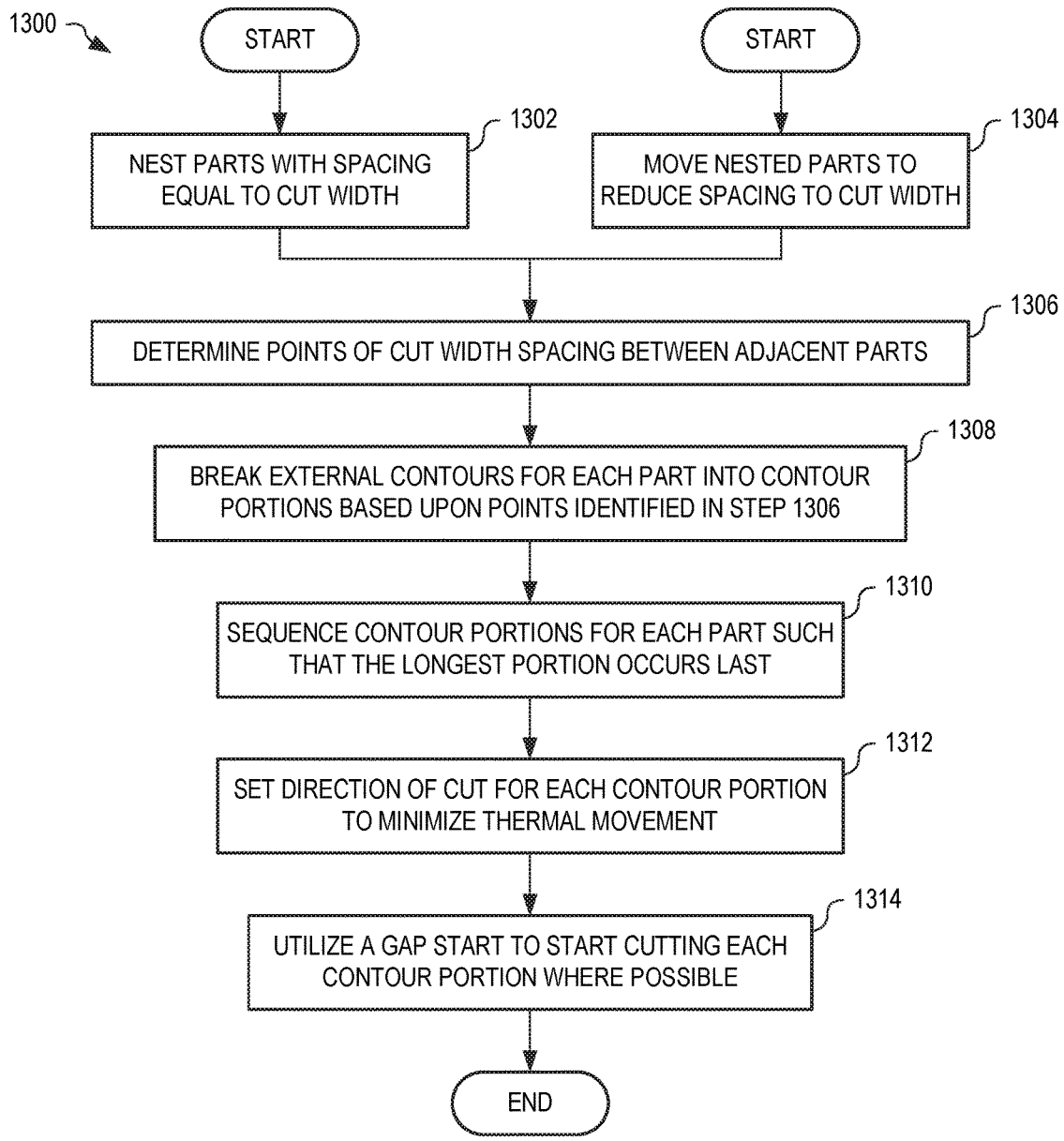
FIG. 13 is a flowchart illustrating an example advanced nesting method for optimally nesting parts on a workpiece, in an embodiment.

FIG. 13 is a flowchart illustrating one exemplary method 1300 for NC plasma common cutting of non-rectangular nested parts. Method 1300 is implemented within NC program generator 138 of NC control 135 for example. Method 1300 has two possible starting points. Where the nest of parts has not been generated, method 1300 starts with step 1302 and then proceeds with step 1306. Where the nest of parts is already provided, method 1300 starts with step 1304 and then proceeds with step 1306.

In step 1302, method 1300 generates a nest of parts with part spacing equal to a cut width of the plasma cutting torch. In one example of step 1302, where nest 139 has not been generated for a particular set of parts 110, NC program generator 138 generates nest 139 with parts 110 spaced from each other by only a cut width of plasma torch 120.

In step 1304, method 1300 moves previously nested parts to reduce spacing between parts to a cut width. In one example of step 1304, NC program generator 138 moves parts 110 within nest 139 to have a spacing of only a cut width of plasma torch 120. That is, NC program generator 138 pushes parts 110 together to have a separation of only a cut width or torch 120 in at least one place. Such spacing allows at least one location where a gap start may be used to start cutting an adjacent part after finishing a current part.

In step 1306, method 1300 determines points of cut width spacing between adjacent parts. In one example of step 1306, NC program generator 138 determines where two parts have only "cut width" spacing, where parts overlap with the plate edge, and where portions of cut paths for both parts overlap. For a particular part, these points are either double cut or not cut because they have been already cut when a previous part was cut, or are part of an edge of the workpiece.

In step 1308, method 1300 breaks the contour for each part into contour portions based upon the points identified in step 1306. Given a desired sequence of cutting as defined by nest 139 for example, the external contour of each part is broken into portions based upon the points identified in step 1306.

In step 1310, method 1300 sequences the contour portions for each part such that the longest portion is cut last. In one example of step 1310, NC program generator 138 sequences the portions determined in step 1308 such that the longest contour portion is cut last. This ensures that the entire part is not separated from the body of the remaining workpiece prematurely.

In step 1312, method 1300 sets the direction of cut for each contour portion to minimize thermal movement. In one example of step 1312, NC program generator 138 sets the cut direction for each contour portion of step 1308 such that torch 120 cuts towards the greatest mass of remaining workpiece, and where necessary NC program generator 138 breaks the contour portion in to smaller portions. Thus, the external contour of each part 100 may be cut by either or both of clockwise and counterclockwise movements of torch 120.

In step 1314, method 1300 utilizes a gap start to start cutting each contour portion where possible. In one example of step 1314, where a start of torch 120 is needed for a particular contour portion, NC program generator 138 utilizes a gap start in a previously cut path corresponding to points identified in step 1306. Where sequencing is less than ideal and no previously cut part is within a cut width of the contour portion, where space permits a traditional pierce and entry is used to start the cut of the contour portion.

Although nesting of parts is well known in the art, the advances described herein for starting and stopping the plasma arc of a cutting torch allow positioning of parts within the nest to improve both material efficiency and time efficiency when cutting parts from a workpiece.

Combination of Features

Features described above as well as those claimed below may be combined in various ways without departing from the scope hereof. The following examples illustrate possible, non-limiting combinations of features of the inventions described above. It should be clear that many changes and modifications may be made to the systems and methods described above without departing from the spirit and scope of this invention.

(A) A method for enhanced numerical control (NC) plasma cutting of parts from a workpiece, includes generating, within a computer, a nest that optimally positions the parts to minimize waste of the workpiece, and generating, based upon the nest, an NC program to control an NC plasma cutting machine to cut the parts from the workpiece using one or both of edge starts and gap starts. The NC program is capable of controlling a plasma cutting torch of the NC plasma cutting machine to cut the parts from the workpiece.

(B) In the method denoted as (A), for each edge start, the NC program ignites a plasma arc of the plasma cutting torch when the plasma cutting torch is positioned off and adjacent an edge of the workpiece and permits immediately lateral movement of the plasma cutting torch.

(C) In the methods denoted as (A) and (B), for each gap start, the NC program ignites the plasma arc when the plasma cutting torch is positioned over a previously made cut and permits immediately lateral movement of the plasma cutting torch.

(D) In the methods denoted as (A)-(C), the plasma cutting torch is moving laterally while the plasma arc is ignited.

(E) In the methods denoted as (A)-(D), the step of generating the nest further including positioning at least two of the parts to have a minimum distance between contours that is substantially equal to a width of a single cut made by the plasma cutting torch.

(F) In the methods denoted as (A)-(E), the step of generating the nest including generating the nest to one or both of (a) minimize cutting distance for the nest and (b) maximize common line cutting, wherein at least two of the parts having commonly shaped contour portions are aligned with one another such that the parts are a cut width apart for the commonly shaped contour portion.

(G) In the methods denoted as (A)-(F), the step of generating the nest including aligning a portion of at least one of the parts to one or more edges of the workpiece.

(H) In the methods denoted as (A)-(G), the step of generating the NC program includes generating the NC program to use an edge start proximate the at least one part to initiate cutting of the part from the workpiece.

(I) In the methods denoted as (A)-(H), the step of generating the nest including positioning a first and second of the parts within the nest such that cutting out of the first part forms at least a portion of a contour of the second part.

(J) In the methods denoted as (A)-(I), the portion of the contour is curved.

(K) In the methods denoted as (A)-(J), the step of generating the NC program including, for an edge start, generating instructions to: (a) position the plasma cutting torch off and adjacent an edge of the workpiece and proximate a contour of one of the parts, and (b) start an arc of the plasma cutting torch while the cutting torch is in motion parallel to the edge prior to following the contour to cut the part from the workpiece.

(L) In the methods denoted as (A)-(K), the step of generating the NC program including, for a gap start, generating instructions to: (a) position the cutting torch over a previously cut path in the workpiece, and (b) start an arc of the plasma cutting torch while the plasma cutting torch is moving along the previously cut path prior to following a contour of a next of the parts to cut the next part from the workpiece.

(M) In the methods denoted as (A)-(L), the step of generating the NC program including generating the NC program to stop the arc of the plasma cutting torch while the plasma cutting torch is moving.

(N) In the methods denoted as (A)-(M), the step of generating the NC program including generating the NC program to stop an arc of the cutting torch at first position along a contour of at least one of the parts and to start the arc of the cutting torch at a second position along the contour and on an opposite side of the part to minimize thermal movement of one or both of (a) the workpiece and (b) the at least one part.

(O) In the methods denoted as (A)-(N), the NC program is generated to control the plasma cutting torch to have a cutting direction at the first position that is opposite the cutting direction of the plasma cutting torch at the second position.

(P) In the methods denoted as (A)-(O), cutting at each of the first and second positions is resumed using a gap start.

(Q) In the methods denoted as (A)-(P), the step of generating the NC program including generating the NC program to control movement of the cutting torch, relative to a part being cut, to selectively have a cutting direction in one of a clockwise direction and a counterclockwise direction to minimize thermally induced movement.

(R) In the methods denoted as (A)-(Q), further including configuring an NC controller of the NC cutting machine to implement an M code that moves the plasma cutting torch laterally while a plasma arc of the plasma cutting torch ignites.

(S) In the methods denoted as (A)-(R), further including configuring an NC controller of the NC cutting machine to implement an M code that moves the plasma cutting torch laterally while a plasma arc of the plasma cutting torch extinguishes.

(T) A system for enhanced numerical control (NC) plasma cutting of parts from a workpiece, includes a processor, a memory communicatively coupled with the processor and storing machine readable instructions that when executed by the processor are capable of: interpreting an edge start M code of an NC program to (a) start a plasma arc of a cutting torch of an NC cutting machine when the cutting torch is positioned off of and adjacent to an edge of a workpiece, and (b) immediately start lateral movement of the cutting torch when the plasma arc is established; interpreting a gap start M code of the NC program to (c) start the plasma arc of the cutting torch when the cutting torch is positioned over a previously cut path on the workpiece, and (d) immediately start lateral movement of the cutting torch when the plasma arc is established; and interpreting a moving off M code of the NC program to extinguish the plasma arc of the cutting torch without stopping lateral movement of the cutting torch until the plasma arc is extinguished.

(U) In the system denoted as (T), the memory further storing machine readable instructions that when executed by the processor are capable of: generating, based upon a shape and size of the workpiece, a nest that efficiently positions the parts within the workpiece based upon utilizing one or more of the edge start M code, the gap start M code, and the moving off M code; generating an NC program based upon the nest and using one or more of the edge start M code, the gap start M code, and the moving off M code; and interpreting the NC program to control the NC plasma cutting machine to cut the parts from the workpiece.

(V) In a numerical control (NC) plasma cutting machine having an NC controller that includes a processor and a memory storing machine readable instructions that when executed by the processor interpret instructions of an NC program to control a cutting torch of the NC plasma cutting machine to cut out parts from a workpiece, wherein the NC controller interprets Geometric moves (G codes) that control movement of the cutting torch and Miscellaneous functions (M codes) that control activation and deactivation of the plasma cutting torch, the improvement including: machine readable instructions stored within the memory that when executed by the processor are capable of interpreting an edge start M code to start a plasma arc of the cutting torch while the cutting torch is (a) positioned off and adjacent to an edge of the workpiece and (b) to immediately, once the plasma arc is established, start lateral movement of the cutting torch.

(W) In the NC plasma cutting machine denoted as (V), the improvement further including machine readable instructions stored within the memory that when executed by the processor are capable of interpreting an gap start M code to start the plasma arc of the cutting torch while the cutting torch is (c) positioned over a previously cut path on the workpiece and (d) to immediately, once the plasma arc is established, start lateral movement of the cutting torch.

(X) In the NC plasma cutting machine denoted as (V) and (W), the improvement further including machine readable instructions stored within the memory that when executed by the processor are capable of interpreting a moving off M code to extinguish the arc of the plasma cutting torch while the plasma cutting torch remains in motion.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece; and
wherein the NC program is configured to move the plasma cutting torch immediately on torch ignition.

2. The method of claim 1, wherein, for each edge start, the NC program ignites a plasma arc of the plasma cutting torch when the plasma cutting torch is positioned off and adjacent an edge of the workpiece and permits immediate lateral movement of the plasma cutting torch.

3. The method of claim 1, the step of generating the nest further comprising positioning at least two of the parts to have a minimum distance between contours that is substantially equal to a width of a single cut made by the plasma cutting torch.

4. The method of claim 1, the step of generating the nest comprising generating the nest to one or both of (a) minimize cutting distance for the nest and (b) maximize common line cutting, wherein at least two of the parts having commonly shaped contour portions are aligned with one another such that the parts are a cut width apart for the commonly shaped contour portion.

5. The method of claim 1, the step of generating the nest comprising aligning a portion of at least one of the parts to one or more edges of the workpiece.

6. The method of claim 5, the step of generating the NC program comprising generating the NC program to use an edge start proximate the at least one part to initiate cutting of the part from the workpiece.

7. The method of claim 1, the step of generating the nest comprising positioning a first and second of the parts within the nest such that cutting out of the first part forms at least a portion of a contour of the second part.

8. The method of claim 7, wherein the portion of the contour is curved.

9. The method of claim 1, the step of generating the NC program comprising generating the NC program to stop the arc of the plasma cutting torch while the plasma cutting torch is moving.

10. The method of claim 1, the step of generating the NC program comprising generating the NC program to stop an arc of the cutting torch at first position along a contour of at least one of the parts and to start the arc of the cutting torch at a second position along the contour and on an opposite side of the part to minimize thermal movement of one or both of (a) the workpiece and (b) the at least one part.

11. The method of claim 1, the step of generating the NC program comprising generating the NC program to control movement of the cutting torch, relative to a part being cut, to selectively have a cutting direction in one of a clockwise direction and a counterclockwise direction to minimize thermally induced movement.

12. The method of claim 1 further comprising continuing to move the plasma cutting torch as if cutting along a desired path as the plasma torch extinguishes.

13. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece;
wherein, for each gap start, the NC program ignites the plasma arc when the plasma cutting torch is positioned over a previously made cut and permits immediately lateral movement of the plasma cutting torch.

14. The method of claim 13, wherein the plasma cutting torch is moving laterally while the plasma arc is ignited.

15. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece; and wherein
the step of generating the NC program comprises, for an edge start, generating instructions to: (a) position the plasma cutting torch off and adjacent an edge of the workpiece and proximate a contour of one of the parts, and (b) start an arc of the plasma cutting torch while the cutting torch is in motion parallel to the edge prior to following the contour to cut the part from the workpiece.

16. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece;
the step of generating the NC program comprising, for a gap start, generating instructions to: (a) position the cutting torch over a previously cut path in the workpiece, and (b) start an arc of the plasma cutting torch while the plasma cutting torch is moving along the previously cut path prior to following a contour of a next of the parts to cut the next part from the workpiece.

17. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece;
where the step of generating the NC program comprising generating the NC program to stop an arc of the cutting torch at first position along a contour of at least one of the parts and to start the arc of the cutting torch at a second position along the contour and on an opposite side of the part to minimize thermal movement of one or both of (a) the workpiece and (b) the at least one part;
wherein the NC program is generated to control the plasma cutting torch to have a cutting direction at the first position that is opposite the cutting direction of the plasma cutting torch at the second position.

18. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece;
where the step of generating the NC program comprising generating the NC program to stop an arc of the cutting torch at first position along a contour of at least one of the parts and to start the arc of the cutting torch at a second position along the contour and on an opposite side of the part to minimize thermal movement of one or both of (a) the workpiece and (b) the at least one part;
wherein cutting at each of the first and second positions is resumed using a gap start.

19. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece; and
further comprising configuring an NC controller of the NC cutting machine to implement an M code that moves the plasma cutting torch laterally while a plasma arc of the plasma cutting torch ignites.

20. A method for enhanced numerical control (NC) plasma cutting of parts from a workpiece, comprising:
generating, within a computer, a nest that optimally positions the parts to minimize waste of the workpiece; and
generating, based upon the nest, an NC program to control an NC plasma cutting machine to cut the parts from the workpiece using one or both of edge starts and gap starts;
wherein the NC program is capable of controlling a plasma cutting torch of the NC plasma cutting machine to cut the parts from the workpiece; and
further comprising configuring an NC controller of the NC cutting machine to implement an M code that moves the plasma cutting torch laterally while a plasma arc of the plasma cutting torch extinguishes.

21. A system for enhanced numerical control (NC) plasma cutting of parts from a workpiece, comprising:
a processor; and
a memory communicatively coupled with the processor and storing machine readable instructions that when executed by the processor are capable of:
for an edge start, (a) starting an arc of a plasma cutting torch while the cutting torch is positioned adjacent an edge of the workpiece and proximate a contour of one of the parts, and (b) immediately moving, when the plasma arc is established, the plasma cutting torch along the edge prior to follow the contour to cut the part from the workpiece; and
for a gap start, (c) positioning the plasma cutting torch at a previously cut path of the workpiece, and (d) starting an arc of the plasma cutting torch while moving the plasma cutting torch along the previously cut path prior to following a contour of one of the parts.

22. A system for enhanced numerical control (NC) plasma cutting of parts from a workpiece, comprising:
a processor; and
a memory communicatively coupled with the processor and storing machine readable instructions that when executed by the processor are capable of:
interpreting an edge start M code of an NC program to (a) start a plasma arc of a cutting torch of an NC cutting machine when the cutting torch is positioned off of and adjacent to an edge of a workpiece, and (b) immediately start lateral movement of the cutting torch when the plasma arc is established;
interpreting a gap start M code of the NC program to (c) start the plasma arc of the cutting torch when the cutting torch is positioned over a previously cut path on the workpiece, and (d) immediately start lateral movement of the cutting torch when the plasma arc is established; and
interpreting a moving off M code of the NC program to extinguish the plasma arc of the cutting torch without stopping lateral movement of the cutting torch until the plasma arc is extinguished.

23. The system of claim 22, the memory further storing machine readable instructions that when executed by the processor are capable of:
generating, based upon a shape and size of the workpiece, a nest that efficiently positions the parts within the workpiece based upon utilizing one or more of the edge start M code, the gap start M code, and the moving off M code;
generating an NC program based upon the nest and using one or more of the edge start M code, the gap start M code, and the moving off M code; and
interpreting the NC program to control the NC plasma cutting machine to cut the parts from the workpiece.

24. In a numerical control (NC) plasma cutting machine having an NC controller that includes a processor and a memory storing machine readable instructions that when executed by the processor interpret instructions of an NC program to control a cutting torch of the NC plasma cutting machine to cut out parts from a workpiece, wherein the NC controller interprets Geometric moves (G codes) that control movement of the cutting torch and Miscellaneous functions (M codes) that control activation and deactivation of the plasma cutting torch, the improvement comprising:
machine readable instructions stored within the memory that when executed by the processor are capable of interpreting an edge start M code to start a plasma arc of the cutting torch while the cutting torch is (a) positioned off and adjacent to an edge of the workpiece and (b) to immediately, once the plasma arc is established, start lateral movement of the cutting torch.

25. In a numerical control (NC) plasma cutting machine having an NC controller that includes a processor and a memory storing machine readable instructions that when executed by the processor interpret instructions of an NC program to control a cutting torch of the NC plasma cutting machine to cut out parts from a workpiece, wherein the NC controller interprets Geometric moves (G codes) that control movement of the cutting torch and Miscellaneous functions (M codes) that control activation and deactivation of the plasma cutting torch, the improvement comprising:
machine readable instructions stored within the memory that when executed by the processor are capable of interpreting an edge start M code to start a plasma arc of the cutting torch while the cutting torch is (a) positioned off and adjacent to an edge of the workpiece and (b) to immediately, once the plasma arc is established, start lateral movement of the cutting torch;
the improvement further comprising machine readable instructions stored within the memory that when executed by the processor are capable of interpreting an gap start M code to start the plasma arc of the cutting torch while the cutting torch is (c) positioned over a previously cut path on the workpiece and (d) to immediately, once the plasma arc is established, start lateral movement of the cutting torch.

26. In a numerical control (NC) plasma cutting machine having an NC controller that includes a processor and a memory storing machine readable instructions that when executed by the processor interpret instructions of an NC program to control a cutting torch of the NC plasma cutting machine to cut out parts from a workpiece, wherein the NC controller interprets Geometric moves (G codes) that control movement of the cutting torch and Miscellaneous functions (M codes) that control activation and deactivation of the plasma cutting torch, the improvement comprising:
machine readable instructions stored within the memory that when executed by the processor are capable of interpreting an edge start M code to start a plasma arc of the cutting torch while the cutting torch is (a) positioned off and adjacent to an edge of the workpiece and (b) to immediately, once the plasma arc is established, start lateral movement of the cutting torch;
the improvement further comprising machine readable instructions stored within the memory that when executed by the processor are capable of interpreting a moving off M code to extinguish the arc of the plasma cutting torch while the plasma cutting torch remains in motion.

* * * * *